(12) United States Patent
Khan et al.

(10) Patent No.: US 10,503,689 B2
(45) Date of Patent: Dec. 10, 2019

(54) IMAGE PROCESSOR I/O UNIT

(71) Applicant: Google LLC, Mountain View, CA (US)

(72) Inventors: Asif Khan, Campbell, CA (US); Jason Redgrave, Mountain View, CA (US); Neeti Desai, Sunnyvale, CA (US); David Warren, Campbell, CA (US)

(73) Assignee: Google LLC, Mountain View, CA (US)

( * ) Notice: Subject to any disclaimer, the term of this patent is extended or adjusted under 35 U.S.C. 154(b) by 241 days.

(21) Appl. No.: 15/595,316

(22) Filed: May 15, 2017

(65) Prior Publication Data

US 2018/0329863 A1 Nov. 15, 2018

(51) Int. Cl.
*G06F 15/78* (2006.01)
*G06T 1/20* (2006.01)

(52) U.S. Cl.
CPC .......... *G06F 15/78* (2013.01); *G06F 15/7867* (2013.01); *G06T 1/20* (2013.01)

(58) Field of Classification Search
CPC ........ G06F 15/78; G06F 15/7867; G06T 1/20
See application file for complete search history.

(56) References Cited

U.S. PATENT DOCUMENTS

| | | | |
|---|---|---|---|
| 5,446,560 A | 8/1995 | Schwartz | |
| 5,973,707 A | 10/1999 | Mita | |
| 6,266,446 B1 | 7/2001 | Rengakuji | |
| 8,355,570 B2 | 1/2013 | Karsanbhai et al. | |
| 8,922,573 B1 | 12/2014 | Choudhary | |
| 9,241,169 B2 | 1/2016 | MacInnis | |
| 9,756,268 B2 * | 9/2017 | Desai | H04N 5/3692 |
| 9,772,852 B2 * | 9/2017 | Meixner | G06T 1/20 |
| 2007/0040842 A1 | 2/2007 | Ishihara | |
| 2017/0249921 A1 * | 8/2017 | Meixner | G06T 1/20 |
| 2017/0287105 A1 * | 10/2017 | Meixner | G06F 9/3887 |
| 2018/0005061 A1 * | 1/2018 | Chang | G06T 1/20 |

FOREIGN PATENT DOCUMENTS

JP    H07-93529    4/1995

OTHER PUBLICATIONS

TW Office Action issued in Taiwanese Application No. 107104602, dated Jan. 9, 2019, 8 pages (English translation).
PCT Written Opinion issued in International Application No. PCT/US2018013808, dated Sep. 6, 2018, 8 pages.

(Continued)

*Primary Examiner* — Bobbak Safaipour
(74) *Attorney, Agent, or Firm* — Fish & Richardson P.C.

(57) ABSTRACT

An image processor is described. The image processor includes a storage circuit to store segments of input image data received in a raster scan format from a camera. The image processor further includes a reformatting circuit to convert the segments of input image data into a block image format. The image processor further includes a processor comprising a two-dimensional execution lane array and a two-dimensional shift register array. The two-dimensional shift register array is to store the input image data that has been formatted into the block image format. The execution lane array is to execute instructions that operate on the image data from the two-dimensional shift register array.

14 Claims, 47 Drawing Sheets

(56) References Cited

OTHER PUBLICATIONS

'PDF.dattasheetcatalog.com' [online] "Zoran Integrated JPEG CODEC ZR36060," Jan. 1997, [retrieved on Aug. 22, 2017] Retrieved from internet: <http://pdf.datasheetcatalog.com/datasheet_pdf/zoran/ZR36060.pdf >. 46 pages.
International Search Report and Written Opinion issued in International Application No. PCT/US2018/013808., dated May 17, 2018, 15 pages.
Klinger et al. "Organization Access of Image Data by Areas," IEEE Translations on Pattern Analysis and Machine Intelligence, vol. 30(1), Jan. 1, 1979, 11 pages.

* cited by examiner

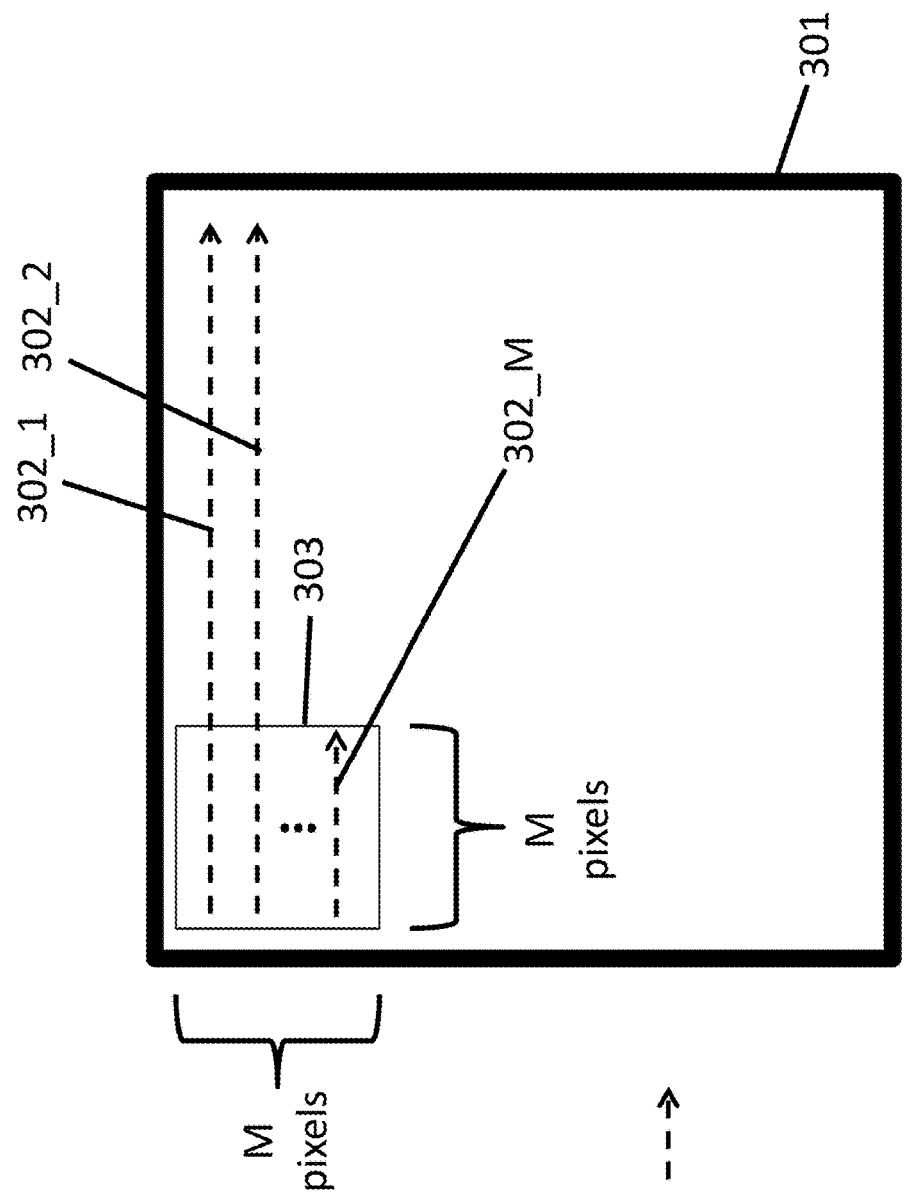

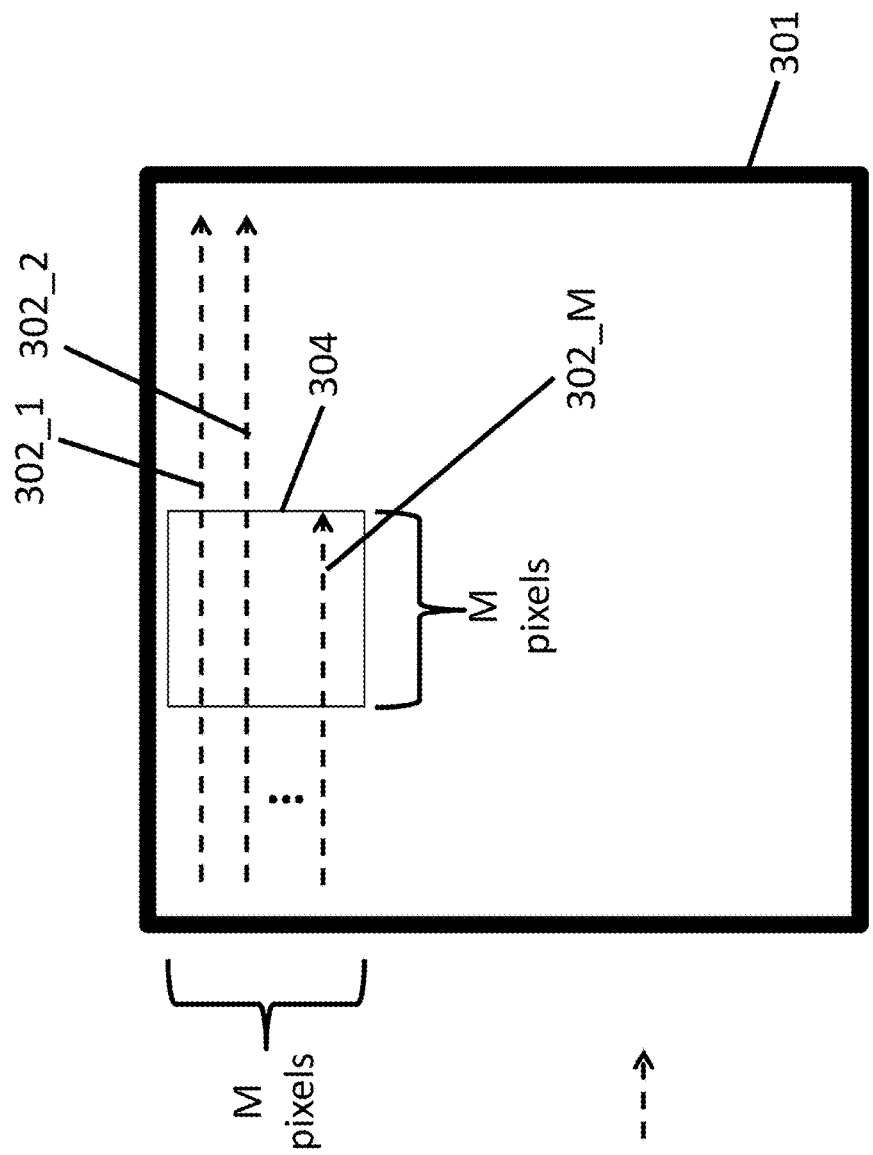

| P1, P2, P3, P4 PTR_1 | P5, P6, P7, P8 PTR_2 | P9, P10, P11, P12 PTR_3 | P13, P14, P15, P16 PTR_4 | | |
|---|---|---|---|---|---|
| P17, P18, P19, P20 PTR_5 | P21, P22, P23, P23 PTR_6 | P25, P26, P27, P28 PTR_7 | P29, P30, P31, P32 PTR_8 | | |
| | | | | | |
| | | | | | |

Fig. 4e

| P1, P2, P3, P4 PTR_1 | P5, P6, P7, P8 PTR_2 | P9, P10, P11, P12 PTR_3 | P13, P14, P15, P16 PTR_4 |
|---|---|---|---|
| P17, P18, P19, P20 PTR_5 | P21, P22, P23, P23 PTR_6 | P25, P26, P27, P28 PTR_7 | P29, P30, P31, P32 PTR_8 |
| P33, P34, P35, P36 PTR_9 | P37, P38, P39, P40 PTR_10 | P41, P42, P43, P44 PTR_11 | P45, P46, P47, P48 PTR_12 |

Fig. 4f

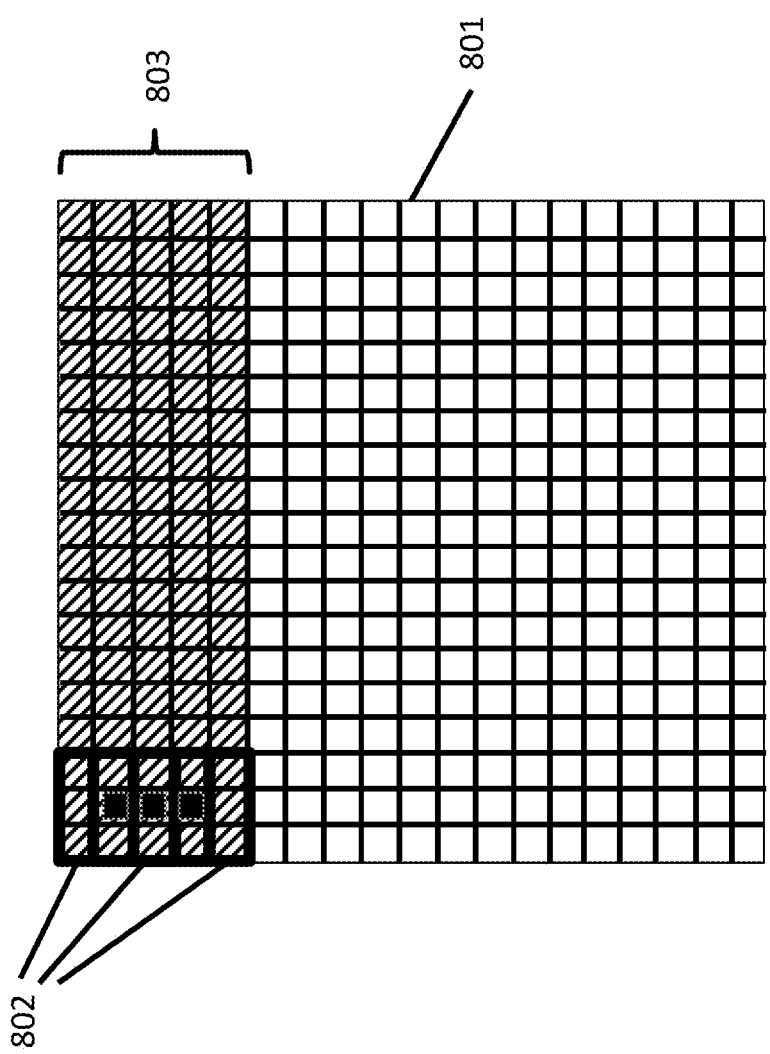

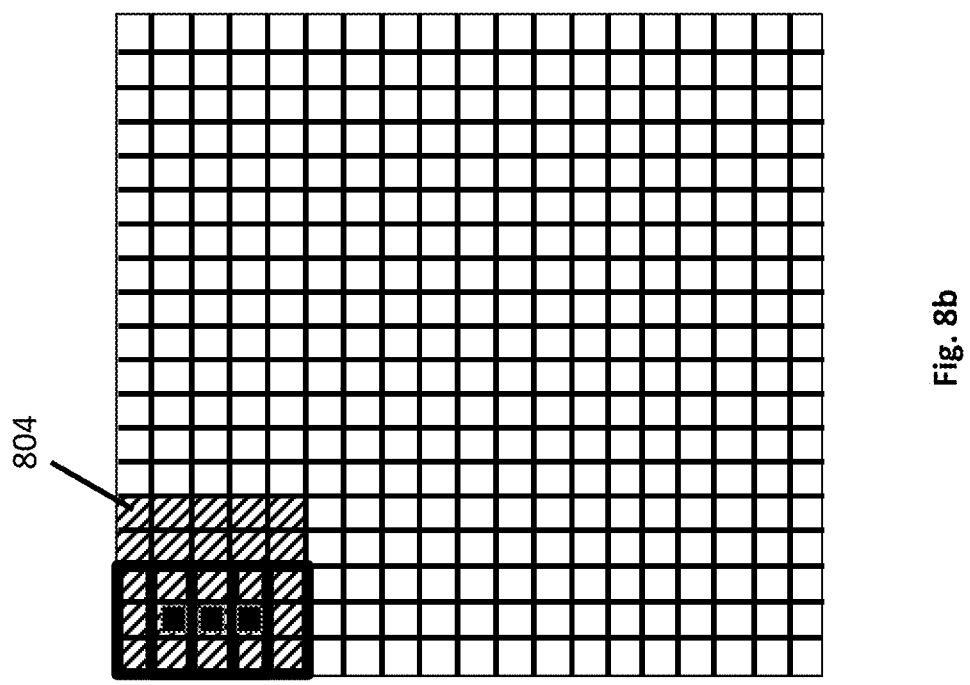

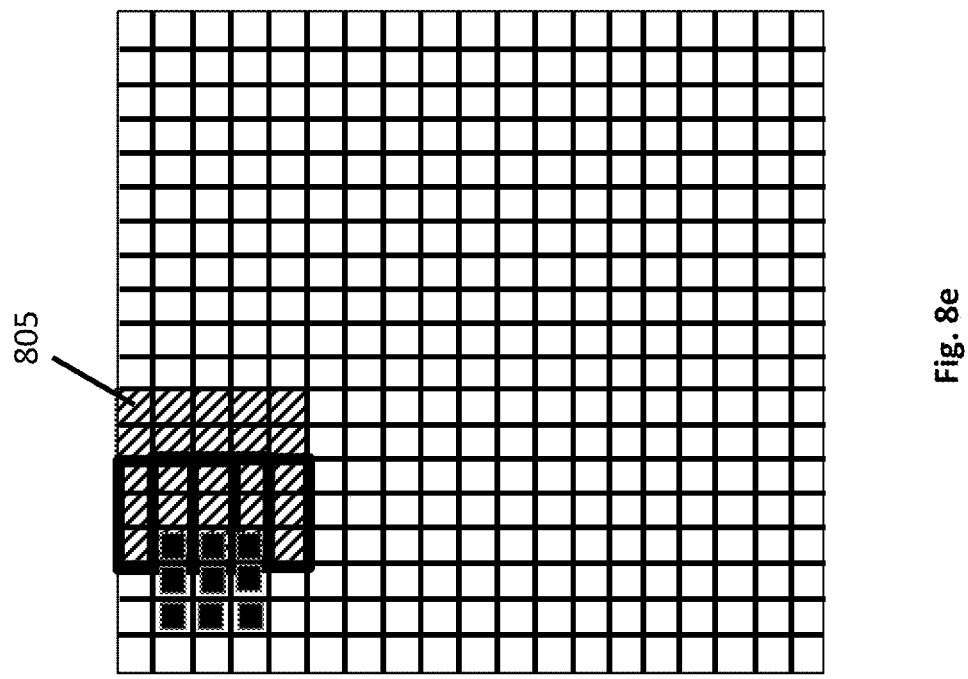

| Scalar instruction 951 | 2D ALU Instruction 952 | Memory Access Instruction 953 | Immediate Operand 954 |

Fig. 9b

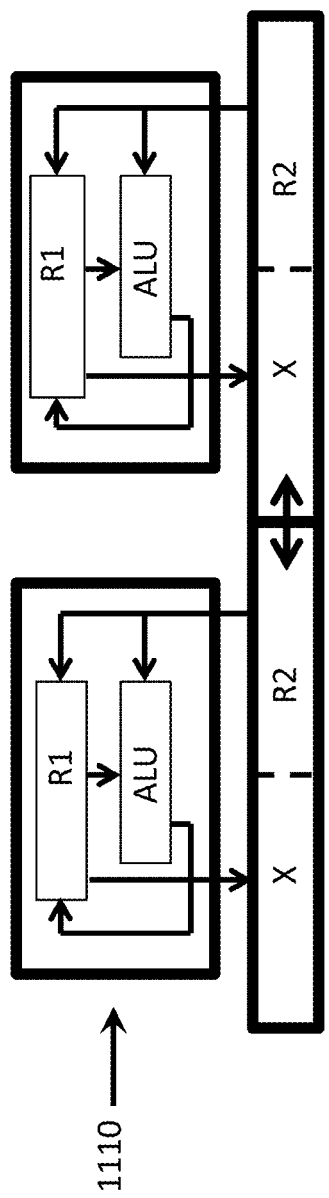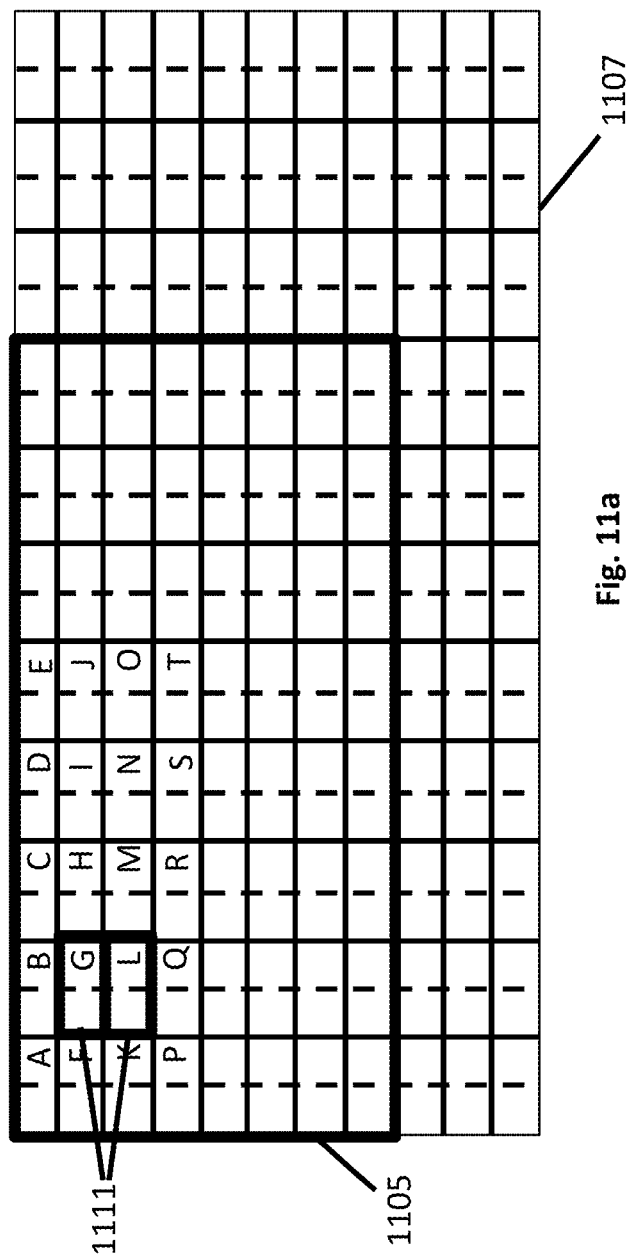
Fig. 11a

IMAGE PROCESSOR I/O UNIT

FIELD OF INVENTION

The field of invention pertains generally to the computing sciences and, more specifically, to image processor I/O unit.

BACKGROUND

Image processing typically involves the processing of pixel values that are organized into an array. Here, a spatially organized two dimensional array captures the two dimensional nature of images (additional dimensions may include time (e.g., a sequence of two dimensional images) and data type (e.g., colors). In a typical scenario, the arrayed pixel values are provided by a camera that has generated a still image or a sequence of frames to capture images of motion. Traditional image processors typically fall on either side of two extremes.

A first extreme performs image processing tasks as software programs executing on a general purpose processor or general purpose-like processor (e.g., a general purpose processor with vector instruction enhancements). Although the first extreme typically provides a highly versatile application software development platform, its use of finer grained data structures combined with the associated overhead (e.g., instruction fetch and decode, handling of on-chip and off-chip data, speculative execution) ultimately results in larger amounts of energy being consumed per unit of data during execution of the program code.

A second, opposite extreme applies fixed function hard-wired circuitry to much larger units of data. The use of larger (as opposed to finer grained) units of data applied directly to custom designed circuits greatly reduces power consumption per unit of data. However, the use of custom designed fixed function circuitry generally results in a limited set of tasks that the processor is able to perform. As such, the widely versatile programming environment (that is associated with the first extreme) is lacking in the second extreme.

A technology platform that provides for both highly versatile application software development opportunities combined with improved power efficiency per unit of data remains a desirable yet missing solution.

SUMMARY

An image processor is described. The image processor includes a storage circuit to store segments of input image data received in a raster scan format from a camera. The image processor further includes a reformatting circuit to convert the segments of input image data into a block image format. The image processor further includes a processor comprising a two-dimensional execution lane array and a two-dimensional shift register array. The two-dimensional shift register array is to store the input image data that has been formatted into the block image format. The execution lane array is to execute instructions that operate on the image data from the two-dimensional shift register array.

FIGURES

The following description and accompanying drawings are used to illustrate various embodiments. In the drawings.

Figure 5A:
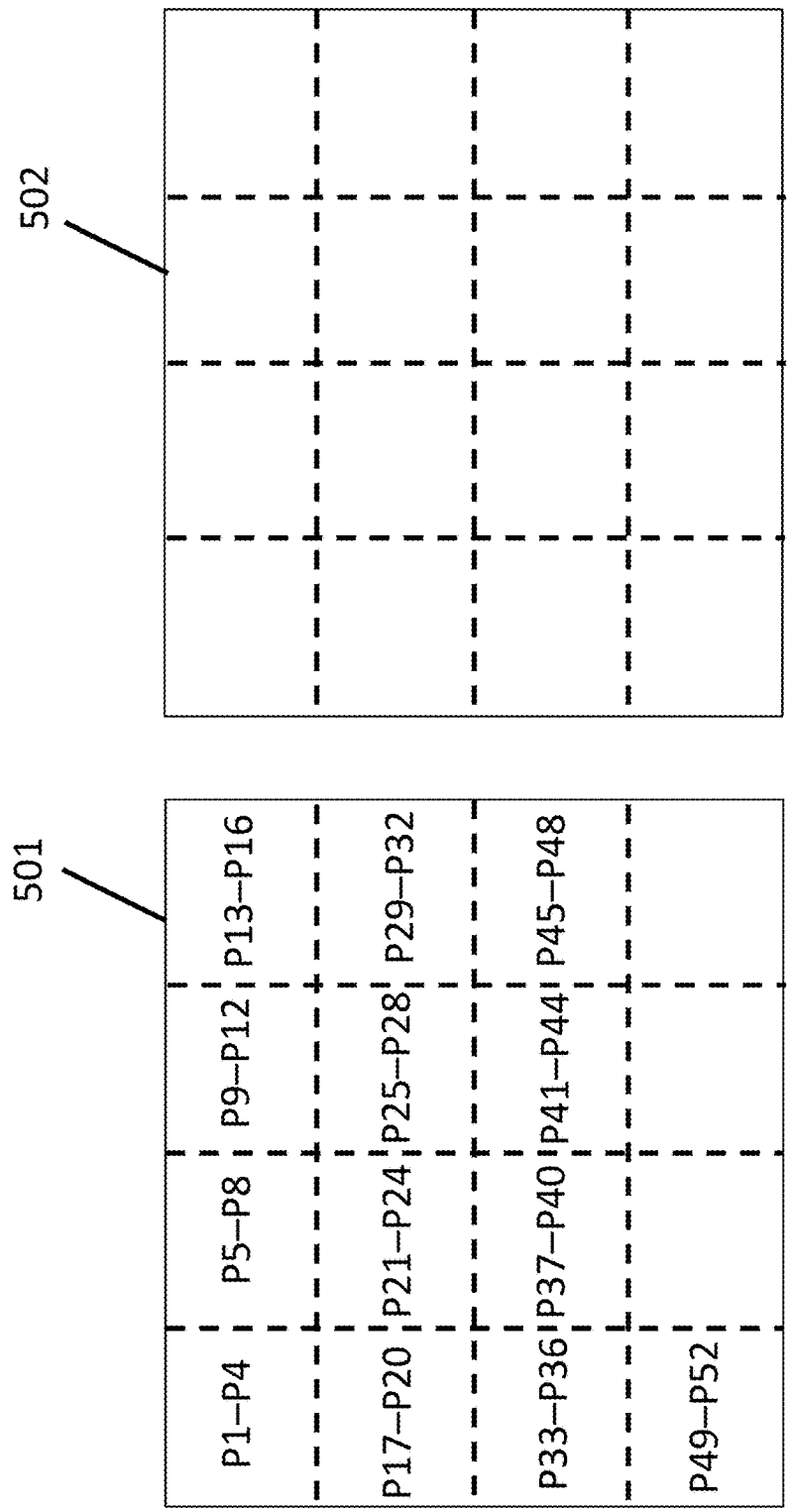
Figure 5B:
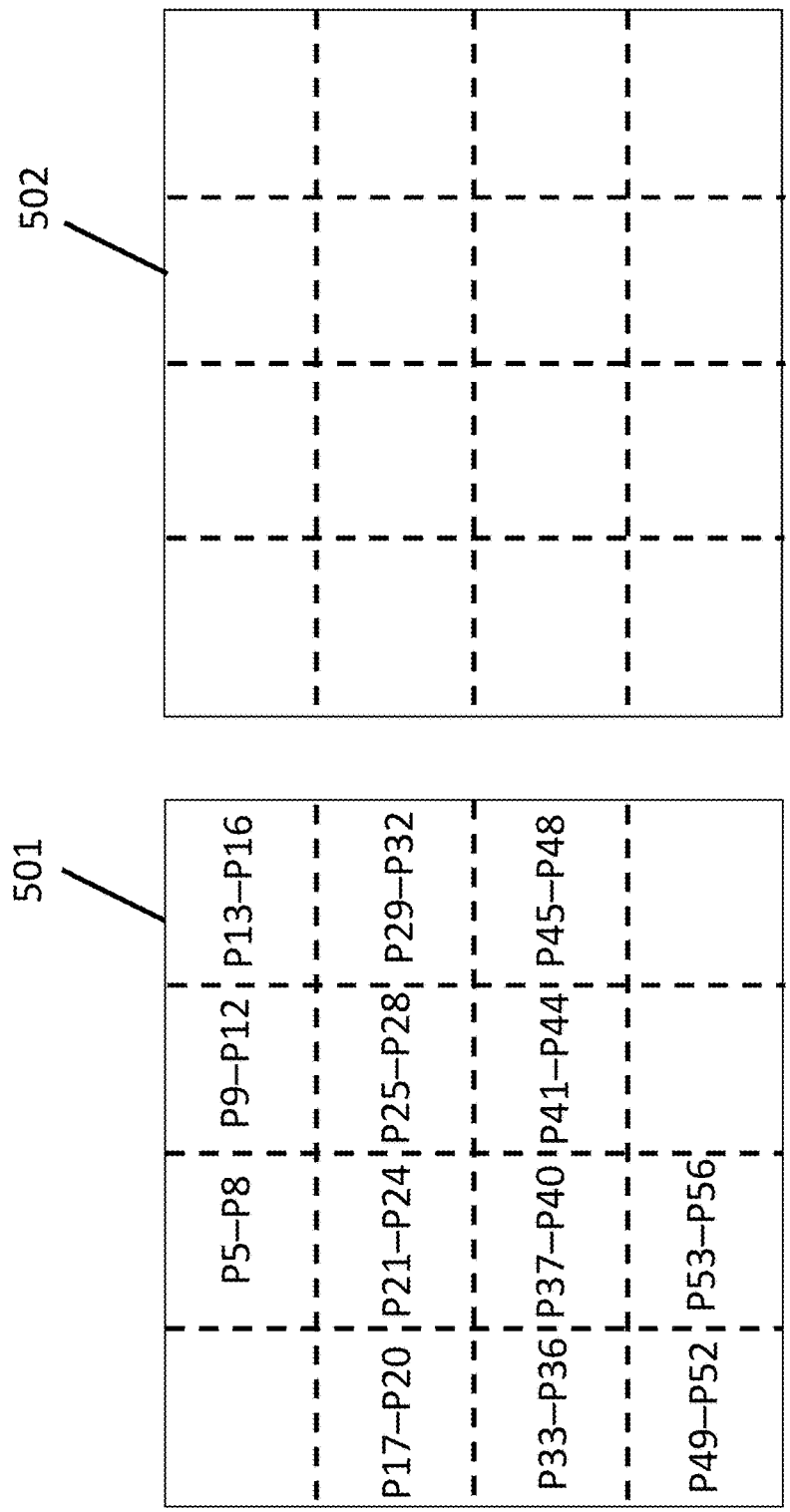
Figure 5C:
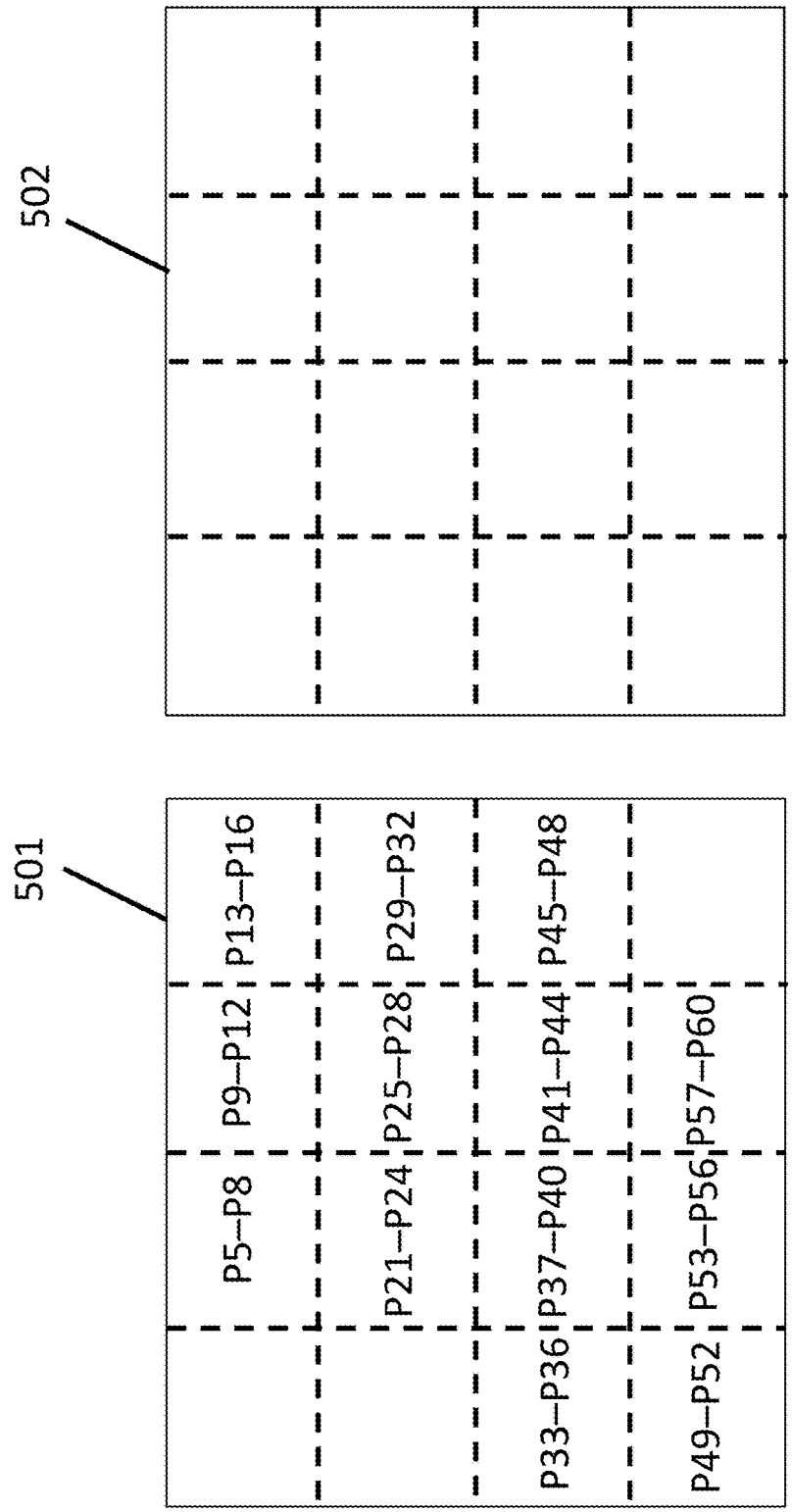
Figure 5D:
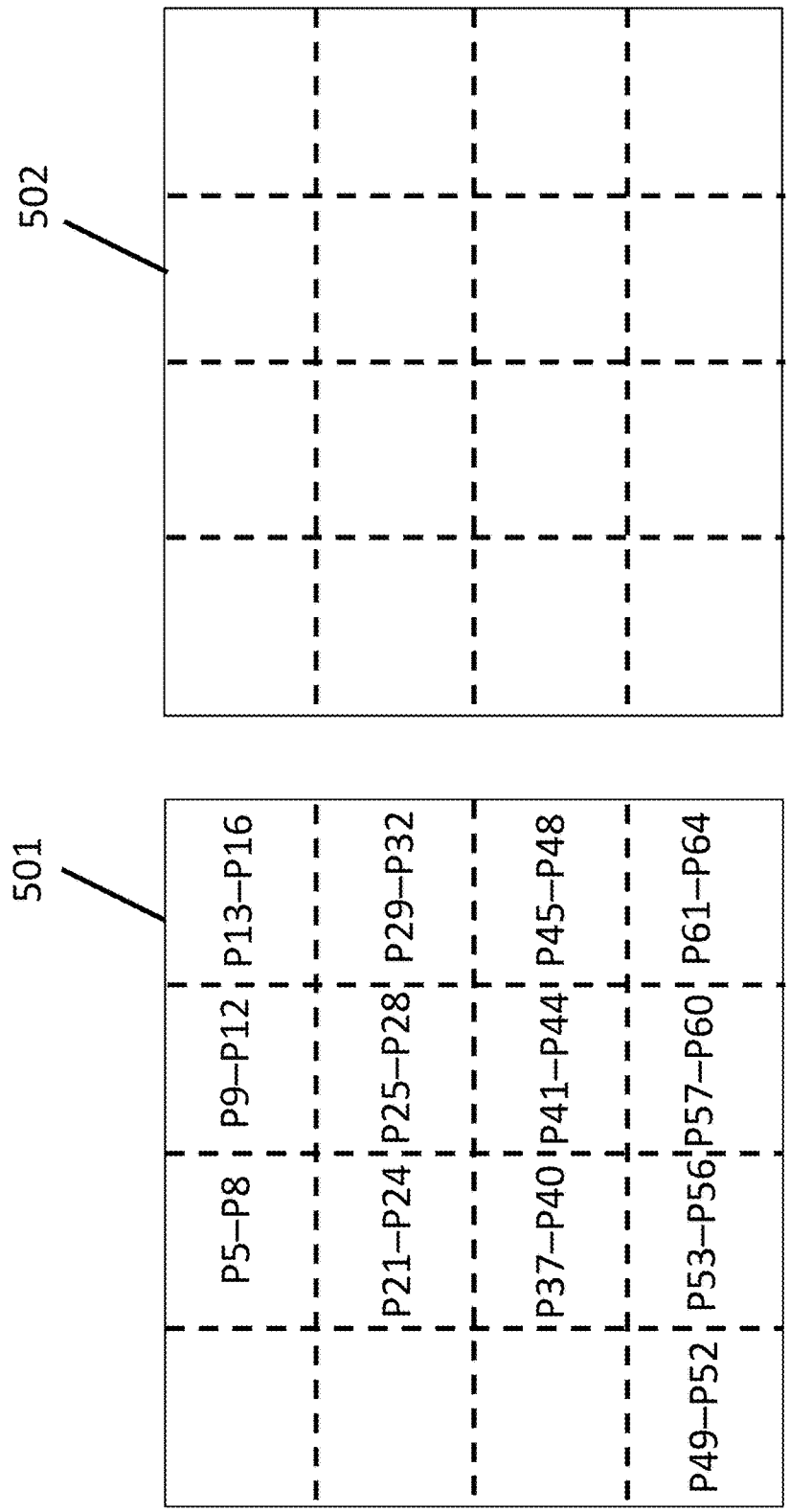
Figure 5E:
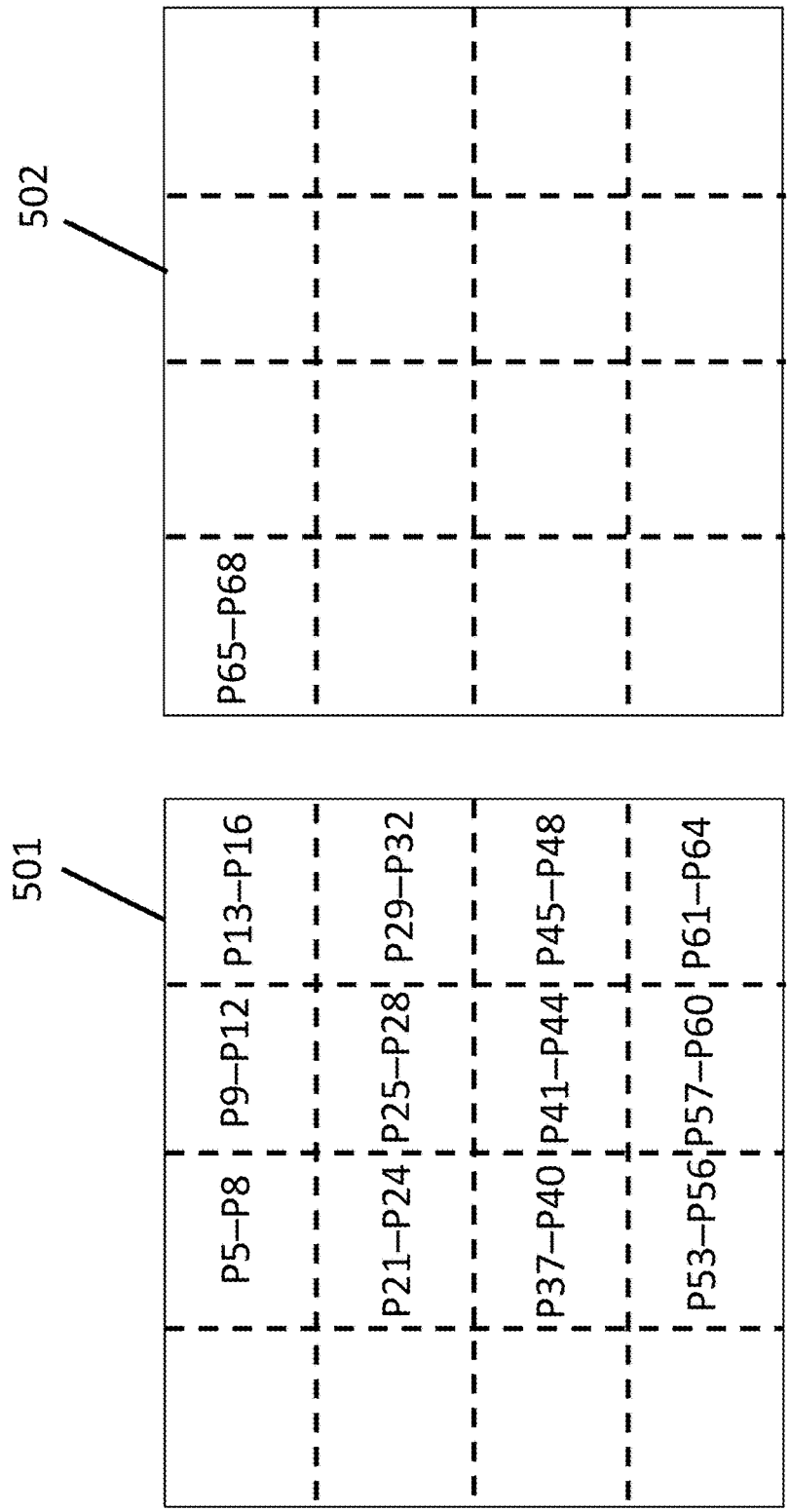
Figure 6:
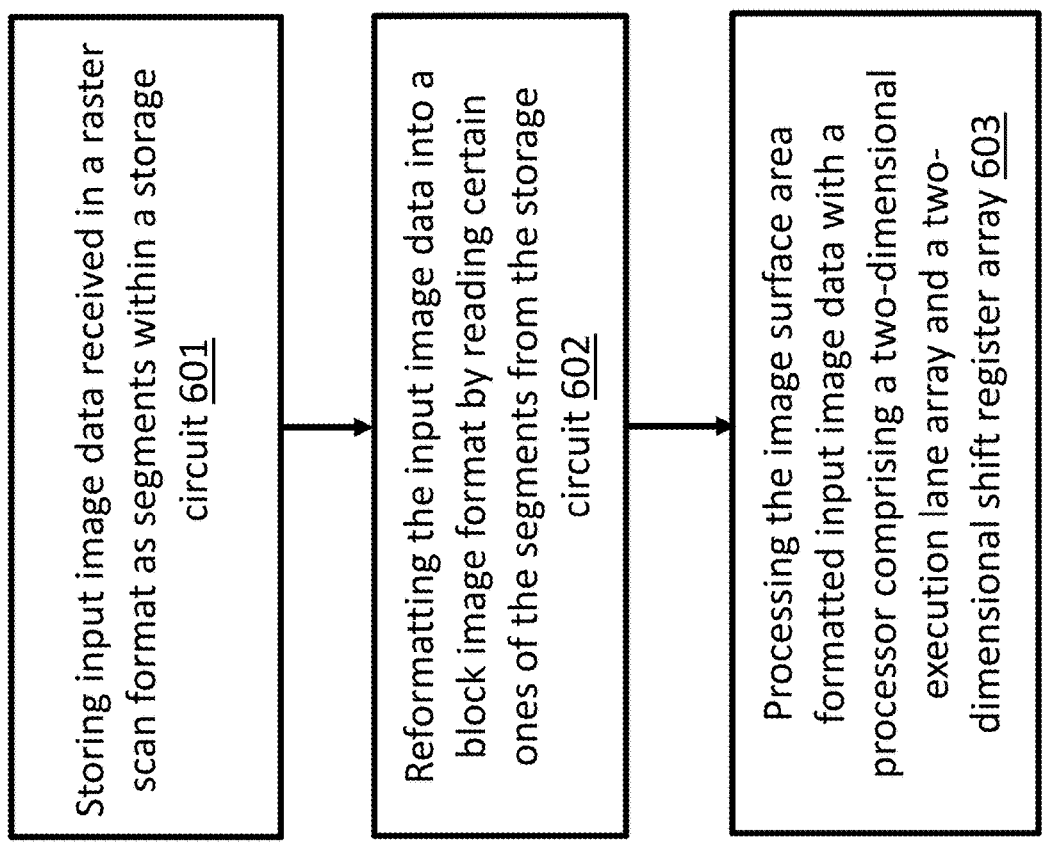
Figure 7:
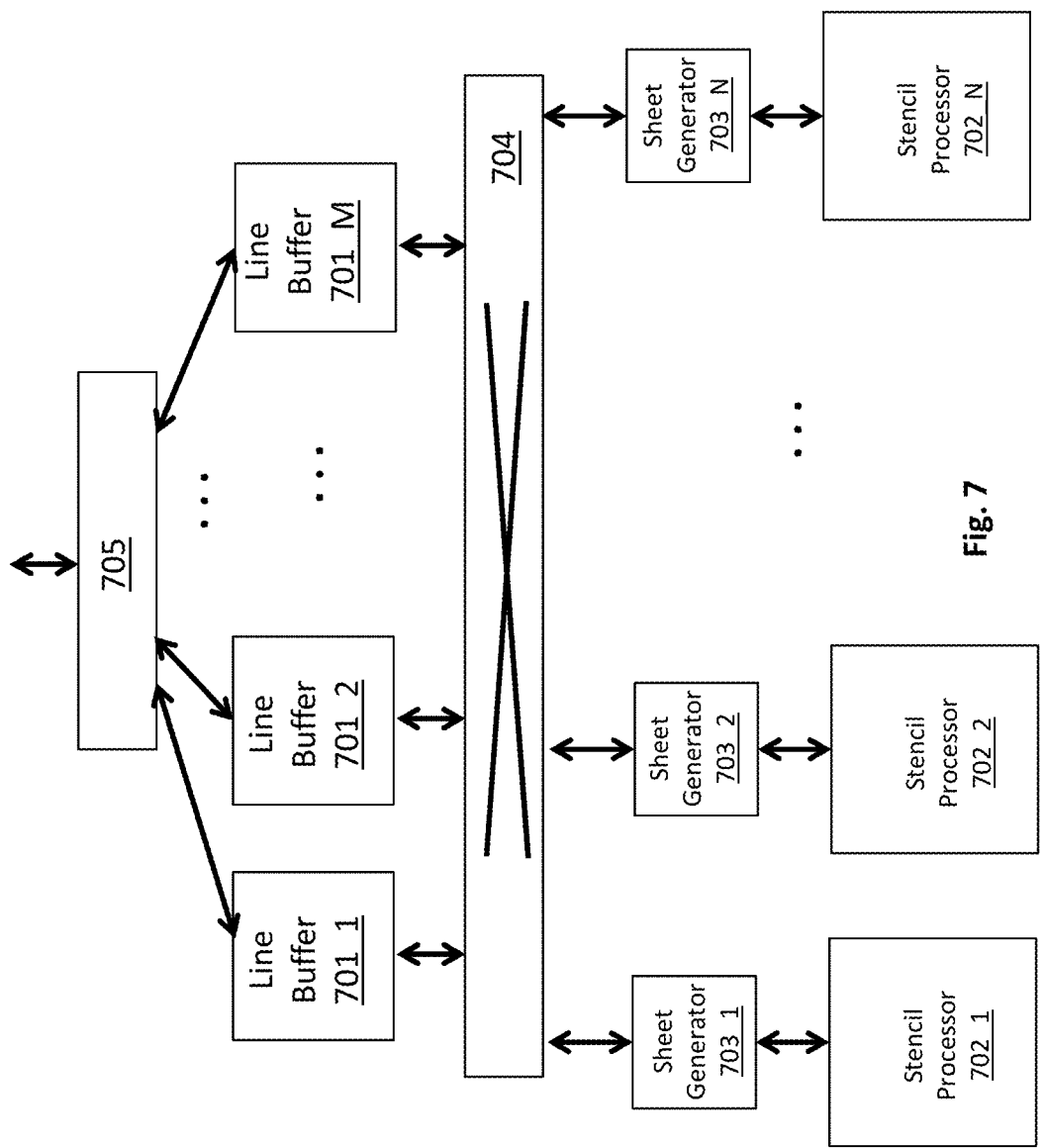
Figure 9A:
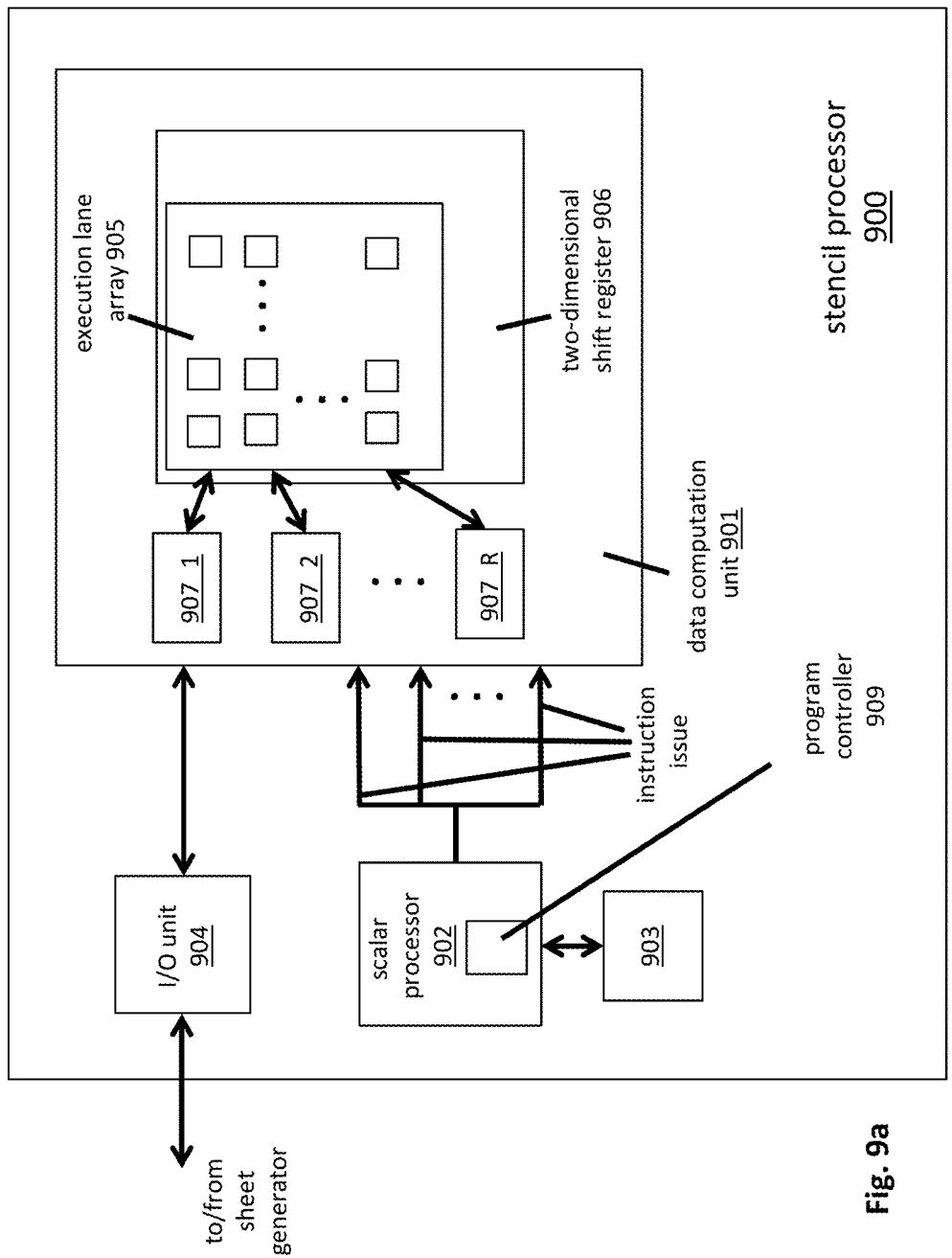
Figure 10:
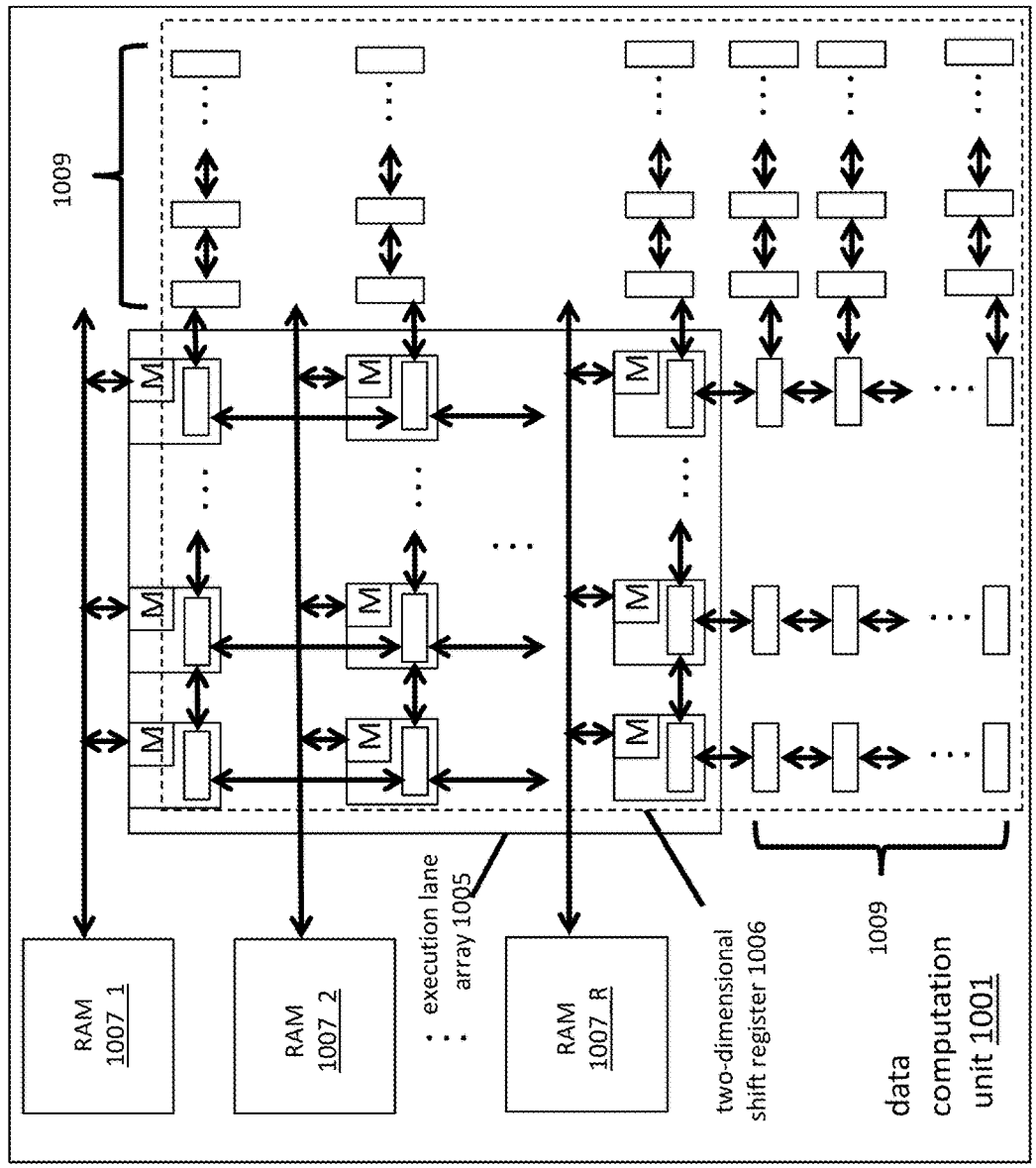
Figure 12:
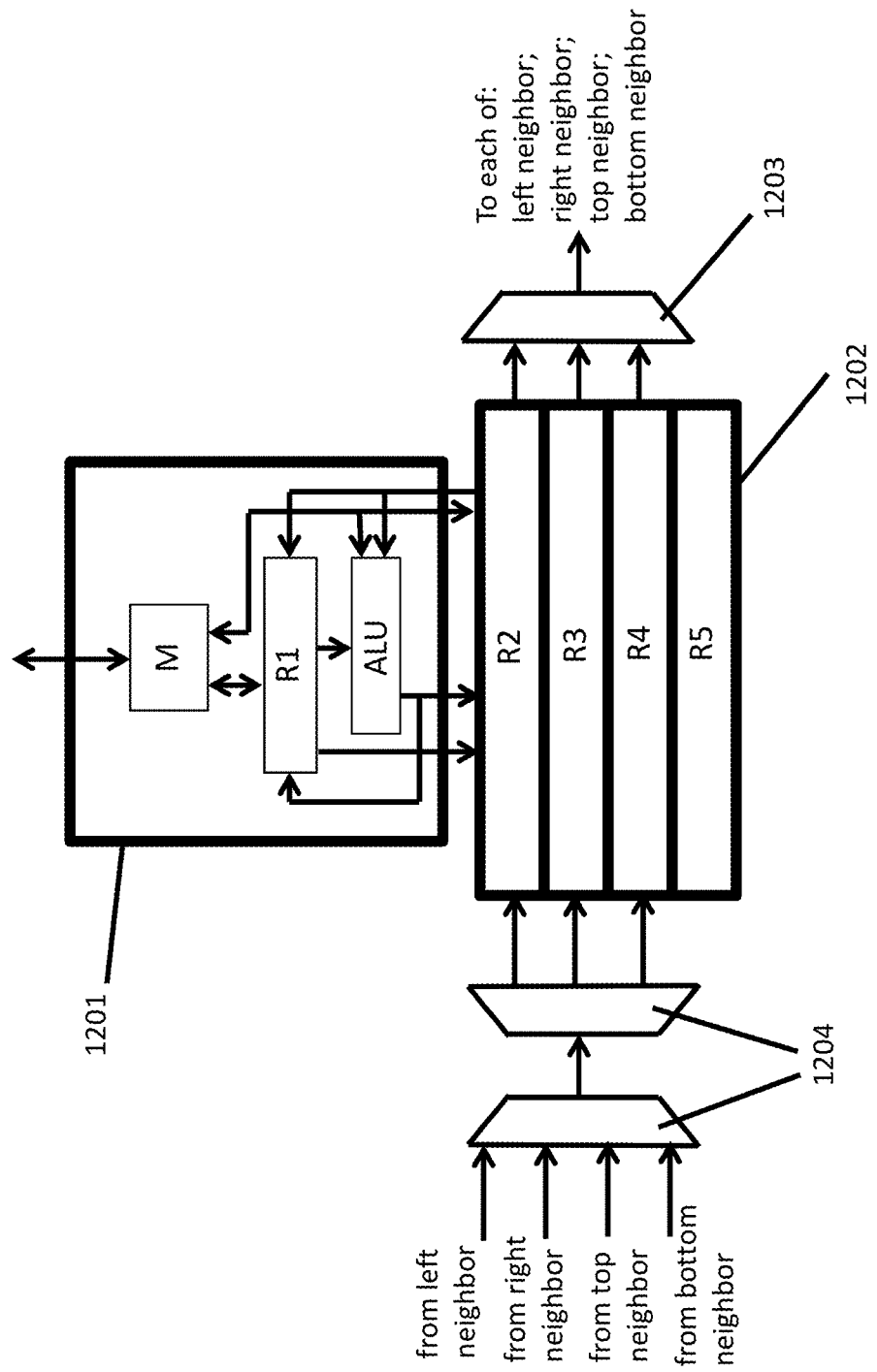
Figure 13:
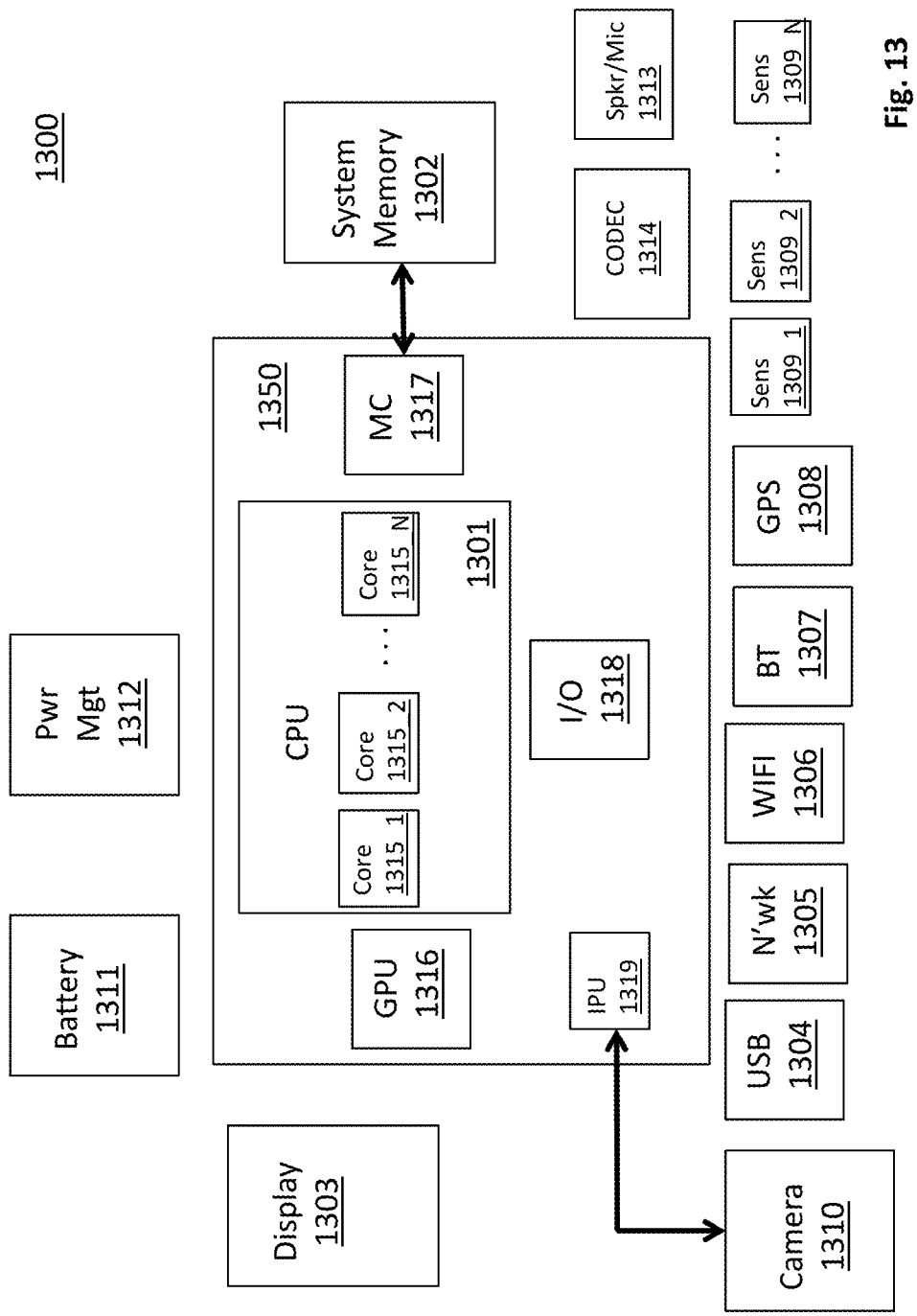

FIGS. 3a and 3b pertain to a raster scan to block input formatting process;

FIGS. 4a through 4k show a first embodiment of a raster scan to block input formatting process;

FIGS. 5a though 5i show a second embodiment of a raster scan to block input formatting process;

FIG. 6 shows a method performed by an image processor I/O unit;

FIG. 7 shows an embodiment of an image processor hardware architecture;

FIGS. 8a, 8b, 8c, 8d and 8e depict the parsing of image data into a line group, the parsing of a line group into a sheet and the operation performed on a sheet with overlapping stencils;

FIG. 9a shows an embodiment of a stencil processor;

FIG. 9b shows an embodiment of an instruction word of the stencil processor;

FIG. 10 shows an embodiment of a data computation unit within a stencil processor;

FIGS. 11a, 11b, 11c, 11d, 11e, 11f, 11g, 11h, 11i, 11j and 11k depict an example of the use of a two-dimensional shift array and an execution lane array to determine a pair of neighboring output pixel values with overlapping stencils;

FIG. 12 shows an embodiment of a unit cell for an integrated execution lane array and two-dimensional shift array;

FIG. 13 shows an exemplary computing system.

DETAILED DESCRIPTION

I/O Unit for Image Processor

As is known in the art, the fundamental circuit structure for executing program code includes an execution stage and register space. The execution stage contains the execution units for executing instructions. Input operands for an instruction to be executed are provided to the execution stage from the register space. The resultant that is generated from the execution stage's execution of an instruction is written back to the register space.

Execution of a software thread on a traditional processor entails sequential execution of a series of instructions through the execution stage. Most commonly, the operations are "scalar" in the sense that a single resultant is generated from a single input operand set. However in the case of "vector" processors, the execution of an instruction by the execution stage will generate a vector of resultants from a vector of input operand sets.

Figure 1:
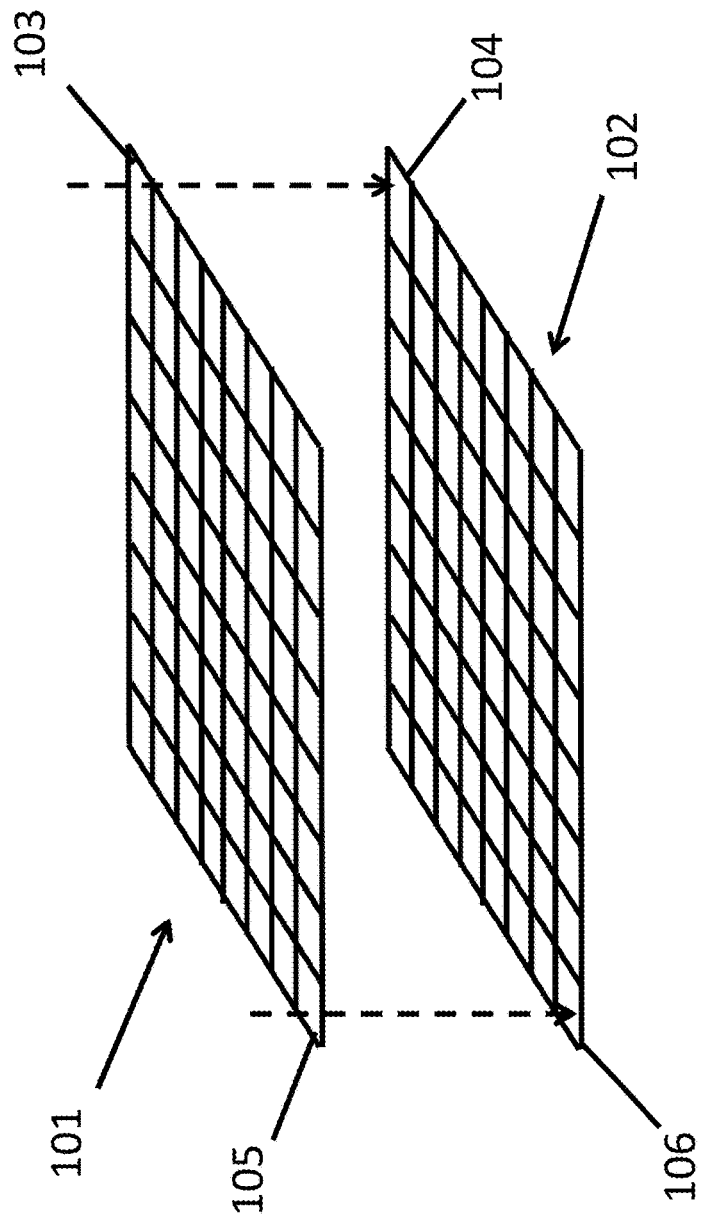
FIG. 1 shows a high level view of a stencil processor architecture.

FIG. 1 shows a high level view of a unique image processor architecture 100 that includes an array of execution lanes 101 coupled to a two-dimensional shift register array 102. Here, each execution lane in the execution lane array can be viewed as a discrete execution stage that contains the execution units needed to execute the instruction set supported by the processor 100. In various embodiments each execution lane receives a same instruction to execute in a same machine cycle so that the processor operates as a two dimensional single instruction multiple data (SIMD) processor.

Each execution lane has its own dedicated register space in a corresponding location within the two dimensional shift register array 102. For example, corner execution lane 103 has its own dedicated register space in corner shift register location 104, corner execution lane 105 has its own dedicated register space in corner shift register location 106, etc.

Additionally, the shift register array 102 is able to shift its contents so that each execution lane is able to directly operate, from its own register space, upon a value that was resident in another execution lane's register space during a prior machine cycle. For example, a +1 horizontal shift causes each execution lane's register space to receive a value from its leftmost neighbor's register space. On account of an ability to shift values in both left and right directions along a horizontal axis, and shift values in both up and down directions along a vertical axis, the processor is able to efficiently process stencils of image data.

Here, as is known the art, a stencil is a slice of image surface area that is used as a fundamental data unit. For example, a new value for a particular pixel location in an output image may be calculated as an average of the pixel values in an area of an input image that the particular pixel location is centered within. For example, if the stencil has a dimension of 3 pixels by 3 pixels, the particular pixel location may correspond to the middle pixel of the 3×3 pixel array and the average may be calculated over all nine pixels within the 3×3 pixel array.

According to various operational embodiments of the processor 100 of FIG. 1, each execution lane of the execution lane array 101 is responsible for calculating a pixel value for a particular location in an output image. Thus, continuing with the 3×3 stencil averaging example mentioned just above, after an initial loading of input pixel data and a coordinated shift sequence of eight shift operations within the shift register, each execution lane in the execution lane array will have received into its local register space all nine pixel values needed to calculate the average for its corresponding pixel location. Because the processor architecture of FIG. 1 is particularly adept at processing over image stencils it may also be referred to as a stencil processor.

Figure 2:
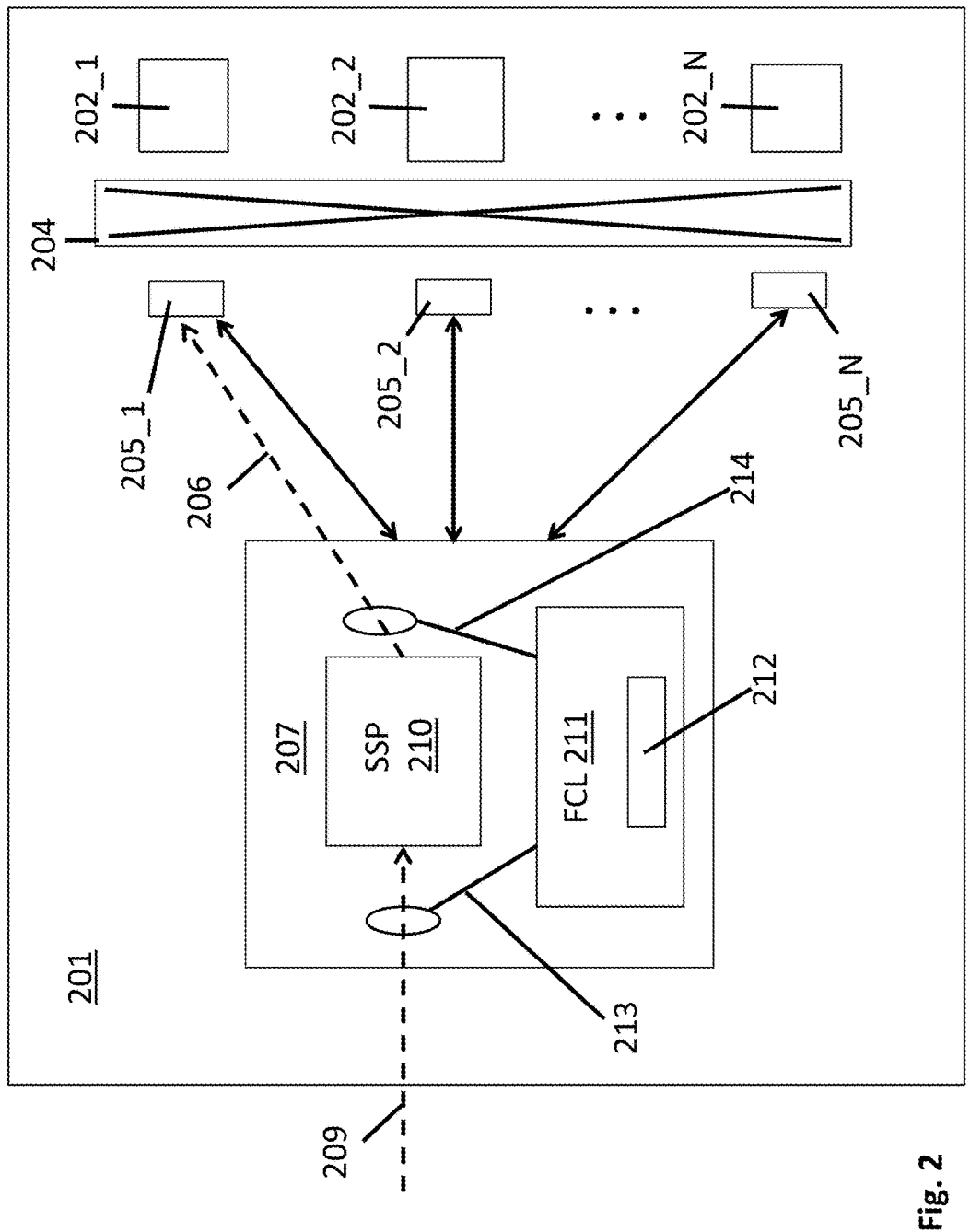
FIG. 2 shows a more detail view of an image processor architecture.

FIG. 2 shows a high level view of an image processor 201 having multiple stencil processors 202_1 through 202_N. Depending on configuration of the overall processor 201, certain ones of the stencil processors 202_1 through 202_N operate directly on input image data that is provided to the image processor 201 from an external source whereas others of the stencil processors 202_1 through 202_N may operate directly on output image data generated by another of the stencil processors 202_1 through 202_N.

As depicted in FIG. 2, a line buffer unit 205_1 is depicted receiving input image data 206 from the image processor's I/O unit 207. The I/O unit 207, as described in more detail further below, reformats externally provided input image data 209 to generate input image data 206. In various embodiments the image data 209 is provided by a camera. Once the line buffer unit 205_1 receives input image data 206, the line buffer unit 205_1 passes the image data 206 through the network 204 to one or more of the stencil processors 202_1 through 202_N for processing. As mentioned above, the stencil processors execute program code and, commonly, shift the image data within their respective two dimensional shift registers to efficiently operate over stencils of the image data.

As alluded to just above, the image processor's I/O unit 207 is responsible for receiving input image data 209 from a source that is external to the image processor (e.g., a memory such as a computing system's main memory, a camera, etc.) and forwarding the image data to the line buffer that feeds the stencil processor that is to process the image data. Likewise, the image processor's I/O unit is also responsible for receiving output image data from any of the line buffers 205_1 through 205_N that receive output data from a stencil processor and forwarding the output image data to a memory (e.g., a computing system main memory), a display or other component that is to receive the image processor's output image data.

Importantly, the image processor's input image data 209 is often formatted as a raster scan, whereas, as described at length above, the stencil processors 202_1 through 202_N themselves operate on two dimensional image surfaces or "blocks" (rather than raster scan image data). As such, the image processor's I/O unit 207 is designed to reformat input image data 209 from a raster scan format to a block image format. The block image formatted input image data 206 is then sent from the I/O unit 207 to one or more of the line buffer units 205_1 through 205_N.

FIG. 3a, shows a high level view of raster scan to block formatting. Here, border 301 corresponds to the overall input image to be processed. The input image data is received as a raster scan which, e.g., corresponds to a consecutive sequence of pixels 302_1, 302_2, 302_M across a same row of the entire input image 301. Thus, for instance, after the first row 302_1 of pixels of the input image are received by the image processor, the second row 302_2 of pixels of the input image are received, etc. The pixels of a same row are received, e.g., in left to right order as depicted in FIG. 3a.

As just described above, however, the stencil processors do not operate on input image data in raster sequence. Rather, the stencil processors operate on two dimensional surface areas of the input image. As such, a sufficient amount of raster scan input data needs to be received by the image processor before it can form a two dimensional surface area, or block, for consumption by a stencil processor.

More specifically, in the depiction of FIG. 3a, assume the stencil processors that are to process the input image data are to process blocks of dimension M pixels by M pixels. In this case, sufficient input data to form the first M×M block 303 exists only after the Mth pixel of the Mth input raster row has been received by the I/O unit. That is, the first block 303 is only realized sometime after the first M−1 input raster rows have been fully received.

Once the first block 303 has been received it can be forwarded to a line buffer unit for processing by a stencil processor. Referring to FIG. 3b, after the next M (2M total) pixels of the Mth input raster row 302_M have been received by the I/O unit, the second full block 304 is realized and can be forwarded to the line buffer unit. The process then repeats such that each next M pixels of received raster scan input data completes formation of a next M×M surface that can be forwarded to the line buffer unit. More specifically, after the last block of the Mth raster scan row 302_M has been received, a next set of blocks can be formed during reception of the 2Mth raster scan row.

Referring back to FIG. 2, in various embodiments, the I/O unit 207 includes a shared storage pool (SSP) 210 and format conversion logic (FCL) 211 to perform the aforementioned raster to block reformatting. As will be more clear from the immediately following discussion, the shared storage pool 210 is, e.g., a memory circuit that stores input raster pixels as a number of, e.g., same sized data segments. In various embodiments, a segment is a group of one or more pixels. Although in embodiments described below the segments have equal size, in alternative embodiments the segments may be variable sized. The format conversion logic 211 keeps track of the progress of the storage of input data segments 213 within the pool and, upon recognizing that a next block of image data has been stored in the pool, reads out the correct segments from the pool 214 to form a block for consumption by a stencil processor.

Figure 4A:
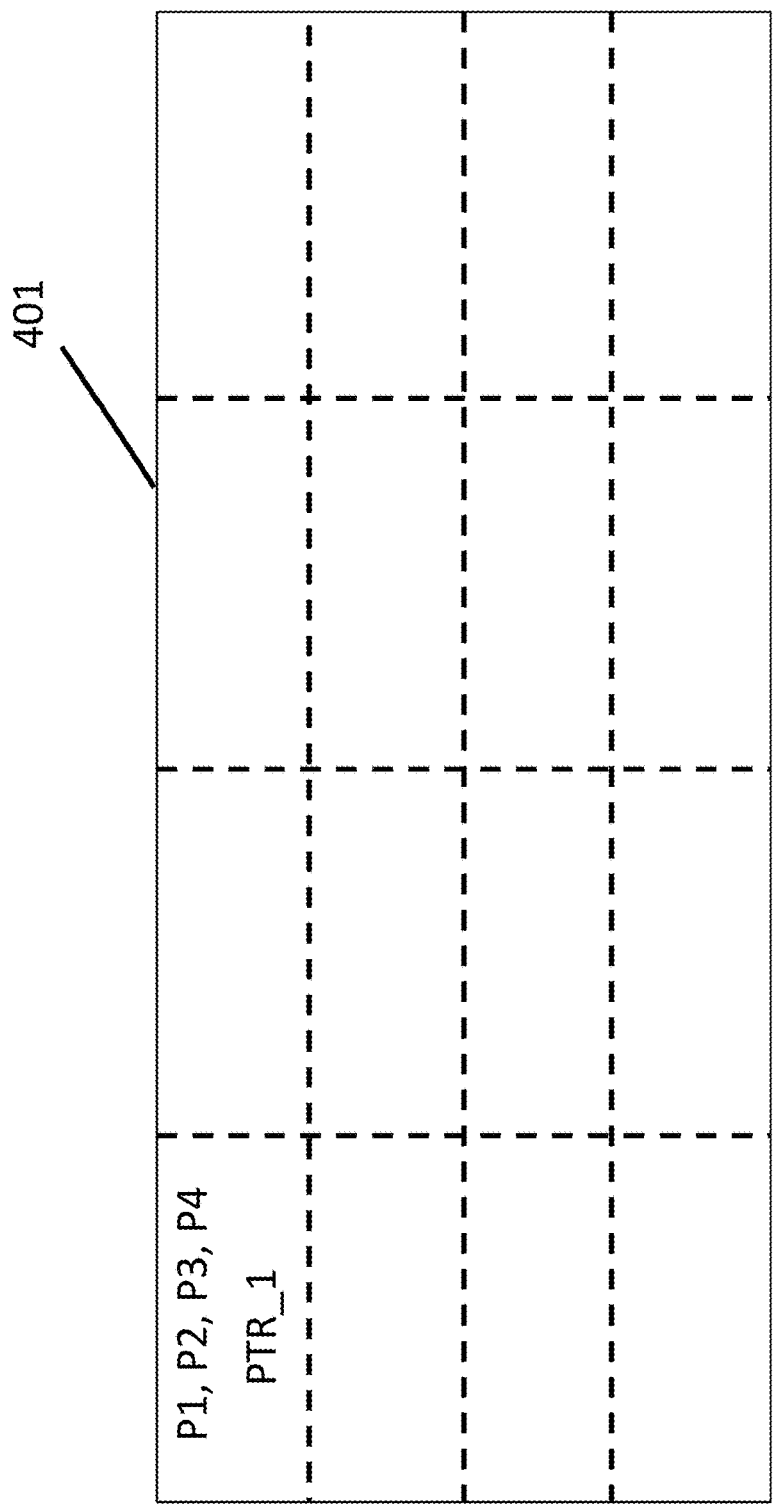

FIGS. 4a-4k pertain to a more detailed explanation of the reformatting operation of the I/O unit. FIG. 4a shows a frame 401 which corresponds to a section of an input image to be processed. For the sake of example, assume the input image to be processed has a width of 16 pixels and that the stencil processor(s) that will operate on the input image will process block images of 4 pixels by 4 pixels. Note that these input image and block dimensions are only exemplary (actual dimensions for these parameters are typically larger).

The contents within the frame 401 have a dual meaning. According to a first perspective, the contents of the frame 401 show the stored segments of input pixel data within the shared segment pool 210. According to a second perspective, the contents of the frame 401 show organized pointer values that are kept by register space 212 within the format conversion logic 211, where, each pointer value points to a specific location in the shared storage pool 210 where a segment is stored in the shared storage pool 210. The dual meaning of the contents of the frame 401 will become more clear in the following discussion.

Referring to FIG. 4a, a first segment of the first four pixels P1 through P4 of the first raster scan row of the input image is stored as a first segment in the shared storage pool 210. The format conversion logic 211 also keeps a pointer value PTR_1 in its register space 212 that points to (e.g., is the memory address of) where the first segment is stored in the shared storage pool.

Figure 4B:
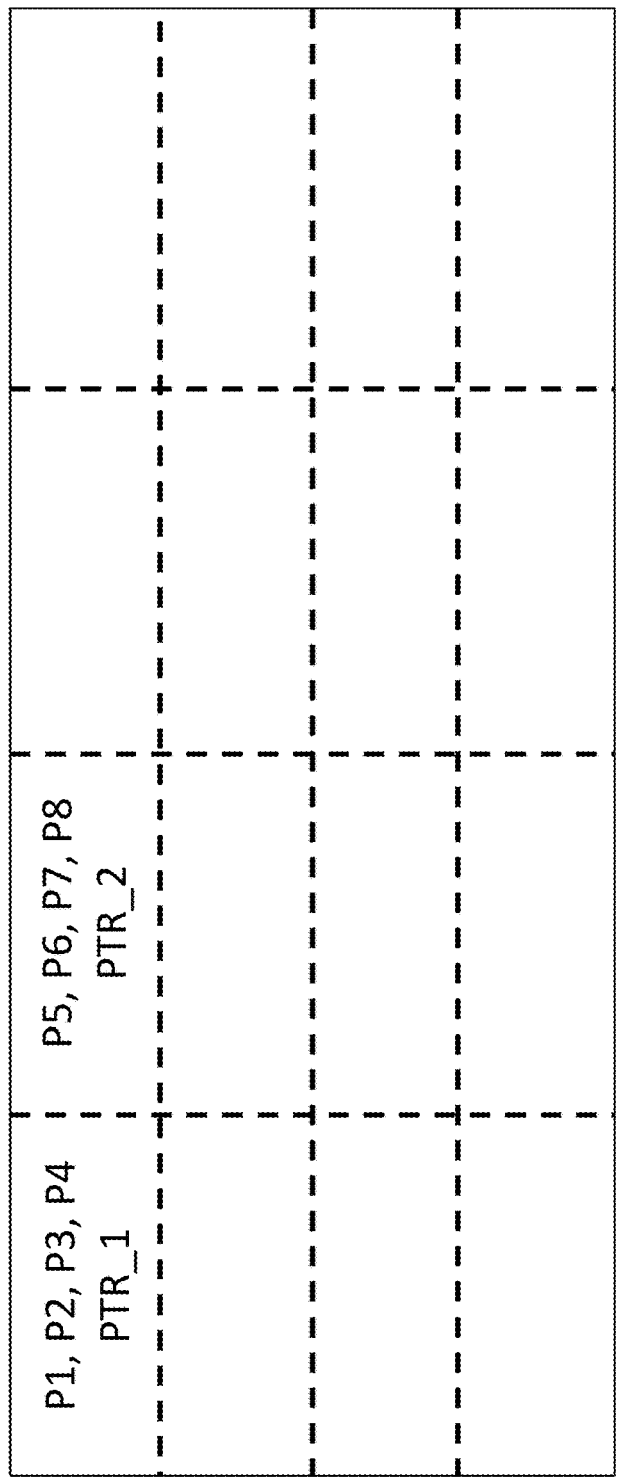
Figure 4C:
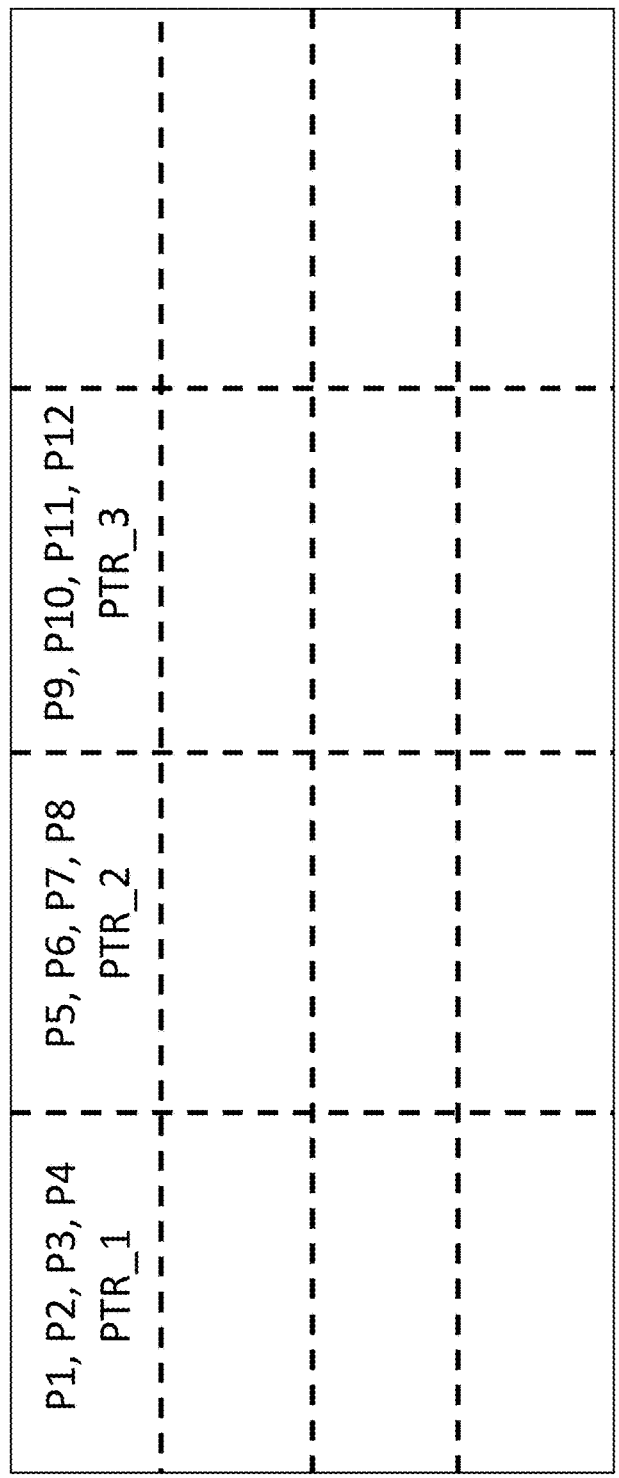
Figure 4D:
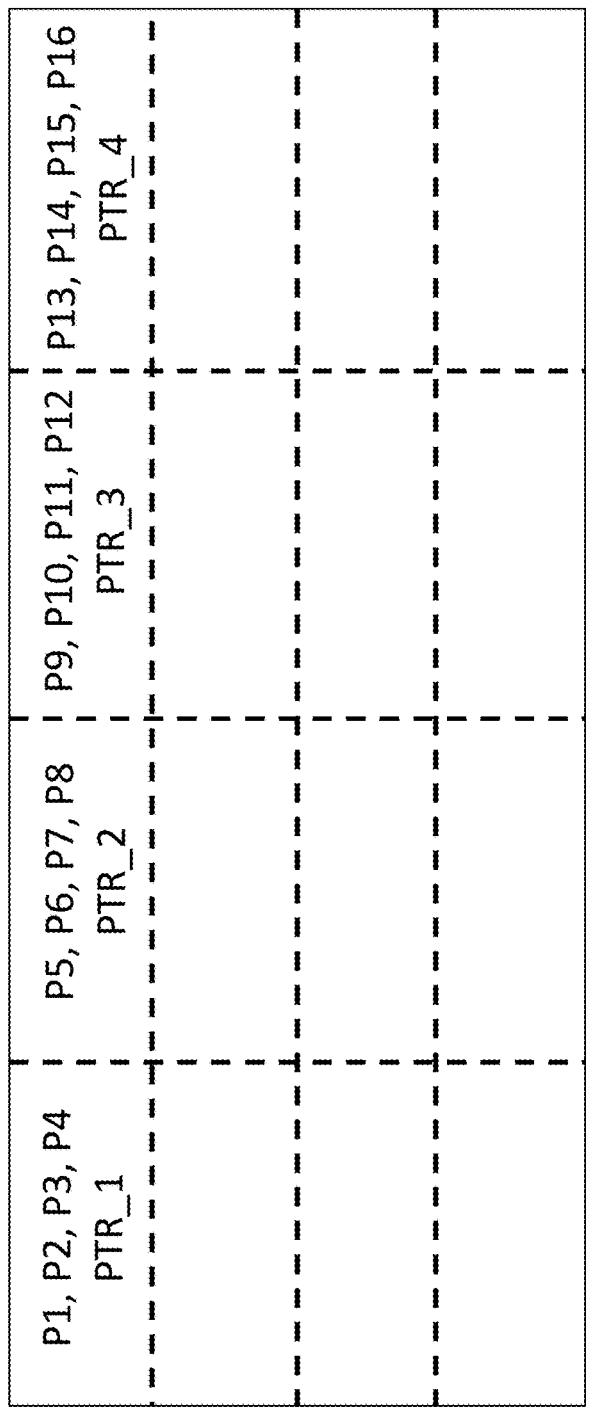

FIGS. 4b through 4d show the following time sequence in which second, third and fourth segments worth of input pixels are received for the first row of the input image's raster scan. That is, pixels P5 through P8 correspond to a second segment's worth of pixels that are stored at a location identified by PTR_2 in the conversion logic's register space 212, pixels P9 through P12 correspond to a third segment's worth of pixels that are stored at a location identified by PTR_3 in the conversion logic's register space 212 and pixels P13 through P16 correspond to a fourth segment's worth of pixels that are stored at a location identified by PTR_4 in the conversion logic's register space 212.

Recalling that the input image has a row width of 16 pixels, note that as of the state of FIG. 4d, the first full row of the input image's raster scan has been stored in the shared storage pool 210. FIG. 4e shows the state of the shared storage pool 210 and the reformatting logic's register space 212 after the second row of the input image's raster scan has been fully received. Here, note that four additional segment's worth of pixels have been consumed in the shared storage pool 210 for pixels P17 through P32. Likewise, four new pointer values PTR_5 through PTR_8 are being kept in the formatting logic's register space 212 that respectively point to these new segments in the shared storage pool 210.

FIG. 4f shows the state of the shared storage pool 210 and the reformatting logic's register space 212 after the third row of the input image's raster scan has been fully received. Again, another four additional segment's worth of pixels have been consumed in the shared storage pool 210 for pixels P33 through P48. Likewise, four new pointer values PTR_9 through PTR_12 are being kept in the formatting logic's register space 212 that respectively point to these new segments in the shared storage pool 210.

Figure 4G:
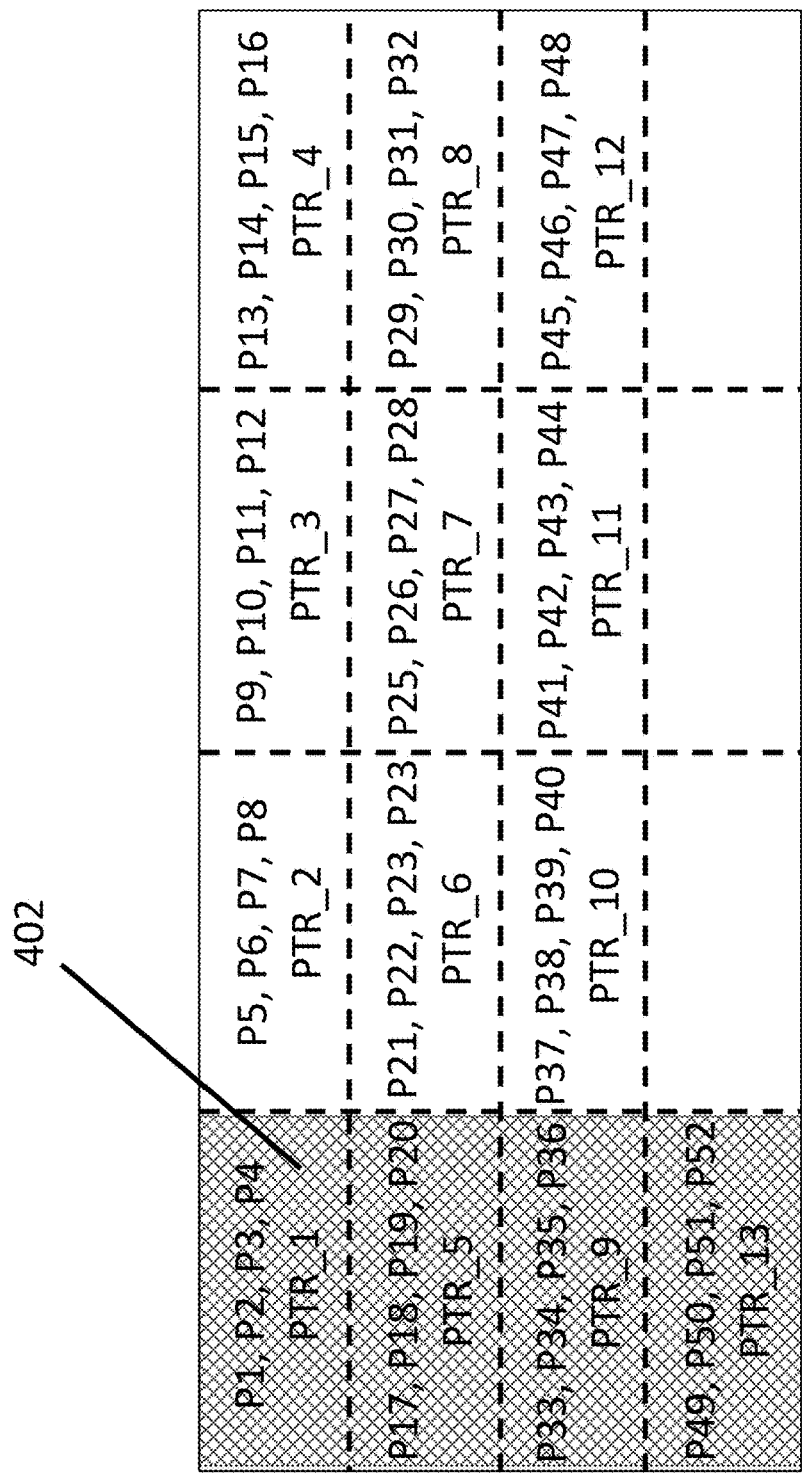

FIG. 4g shows the state of the shared storage pool 210 and the reformatting logic's register space 212 after the first segment of the fourth row of the input image's raster scan has been stored in the shared storage pool 210 and the register space 212 of the reformatting logic has been updated to include a pointer value PTR_13 that points to this segment. Importantly, with the storage of the first segment of the fourth row of input image data, the shared storage pool 210 is now keeping the first full block image (highlighted by shaded region 402) that can be operated upon by a stencil processor.

With the reformatting logic 211 recognizing that the addition of pointer PTR_13 into its register space 212 corresponds to the storage of the first block image 402, the reformatting logic 211 proceeds to read the content of pointers PTR_1, PTR_5, PTR_9 and PTR_13 from the shared storage pool 210. That is, the contents of the first column of frame 401 (which corresponds to shaded region 402) are read from the shared storage pool 210 by the reformatting logic 211 and forwarded to the line buffer unit that feeds the one or more stencil processors that are to operate on the input image data. Commensurate with the reading of the content for the first block image from the storage pool 210, the next (second) segment's worth of image data from the input raster scan (pixels P53 through P56) is also stored in the shared storage pool 210.

Figure 4H:
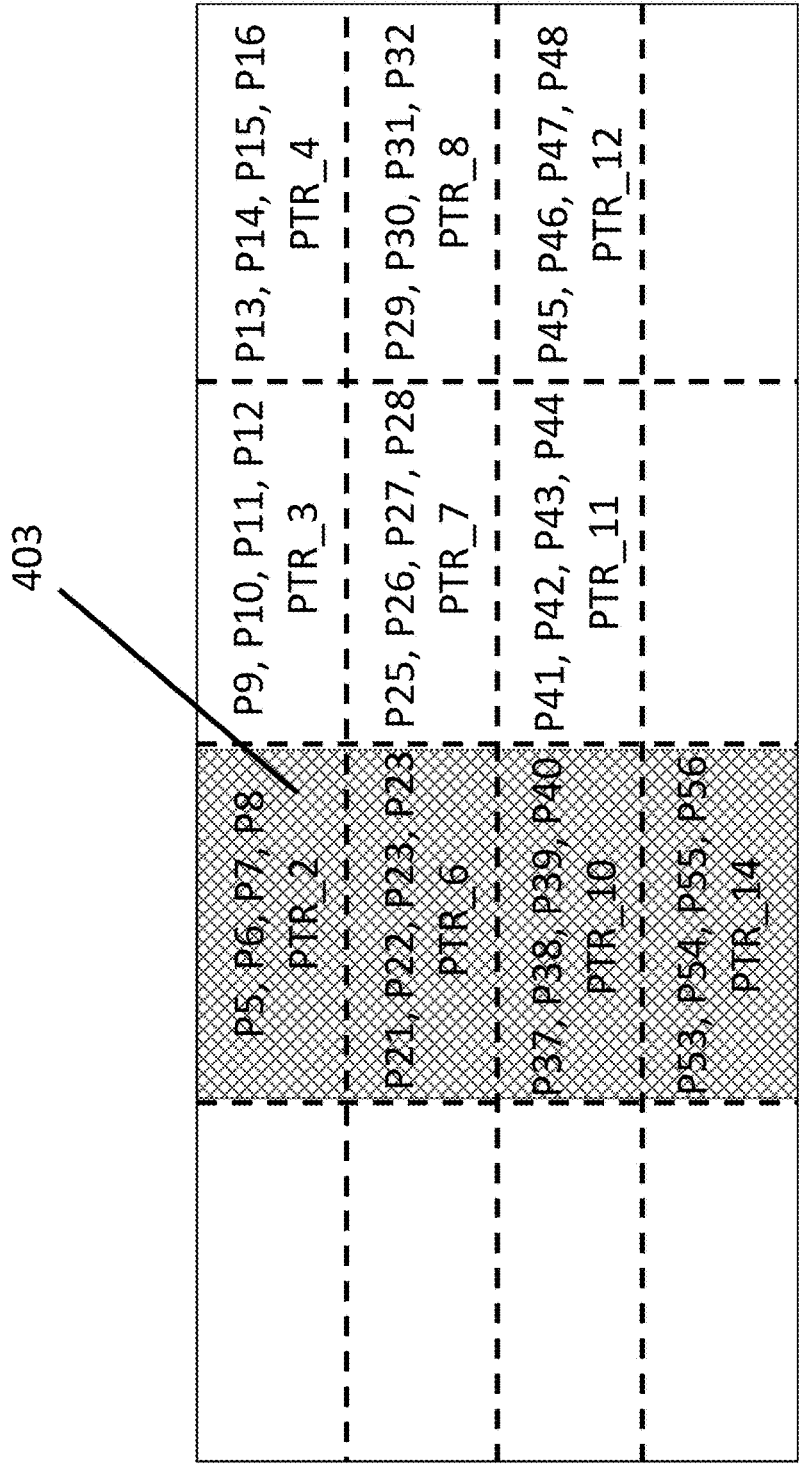

FIG. 4h shows the state of the system with the content of the first block being eligible to be written over by new input data. That is, the pointers of the first full block 402 (pointers PTR_1, PTR_5, PTR_9 and PTR_13) have been returned to the shared storage pool 210, or otherwise identified to the shared storage pool 210, so that the shared storage pool understands that their content has been consumed by the reformatting process and are free to be written over. In an embodiment, the pointers enter a free list maintained by logic circuitry of the shared storage pool 210. The shared storage pool 210, as part of the process of storing a newly received segment of input image data, removes a pointer from the free list to assign the pointer (and its corresponding memory address into the storage pool) to the segment.

FIG. 4h also shows that with the storage of the second segment of the fourth input raster scan row, the second block for consumption by a stencil processor (shaded area 403) has also been received. As such, the second column of segments is read from the shared storage pool 210 and the corresponding pointers returned to the storage pool's free list.

Figure 4I:
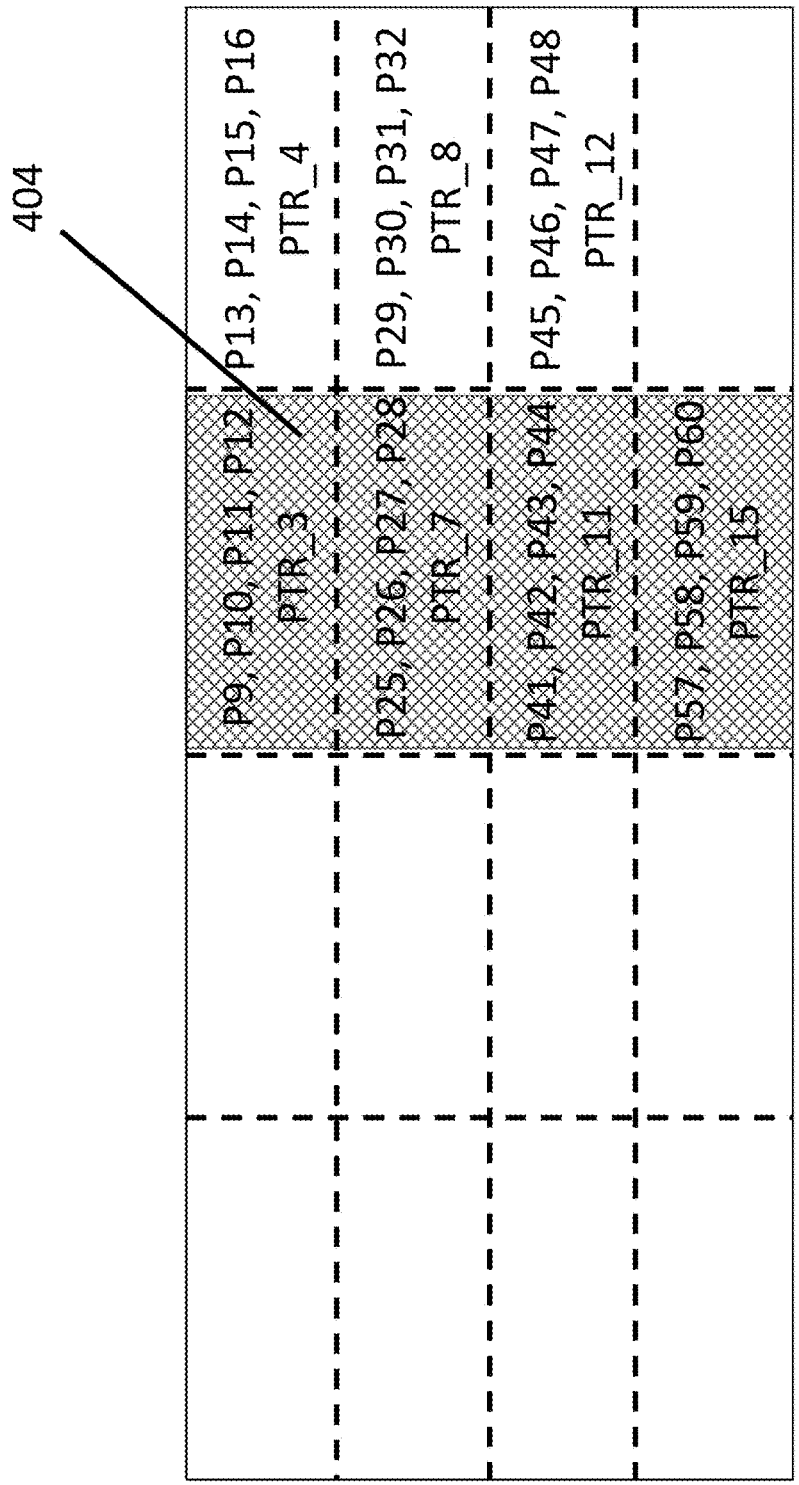

FIG. 4i shows the resulting state commensurate with the reception of the third segment of raster scan data along the fourth row of the image which completes the formation of the third block image for consumption by a stencil processor. The process then continually repeats with each next stored segment completing a next block.

Figure 4J:
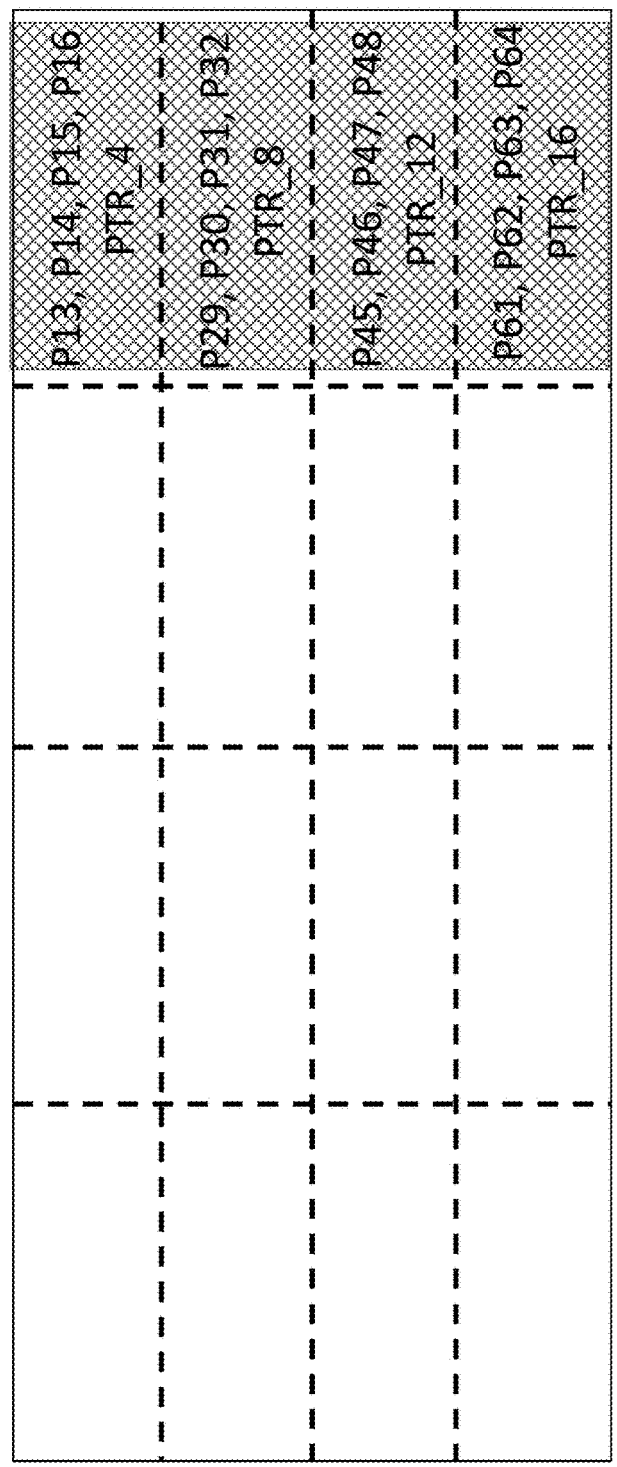
Figure 4K:
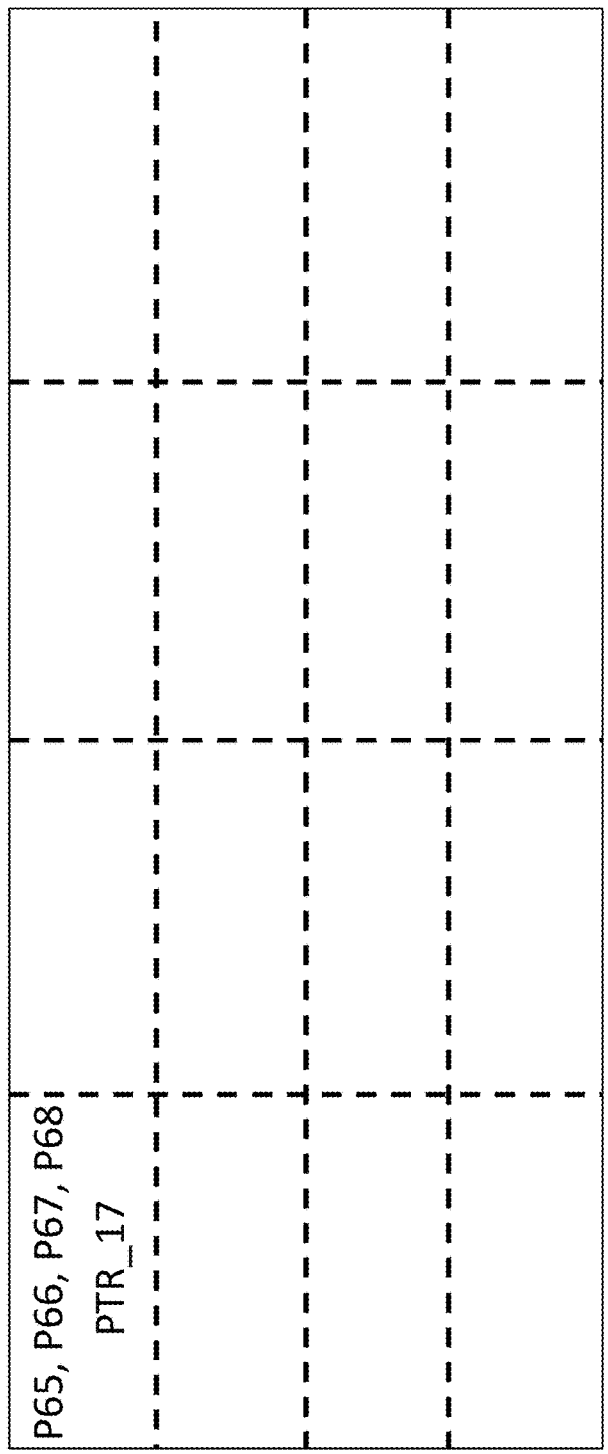

FIG. 4j shows the state after storage of the fourth segment of the fourth raster scan row. As observed in FIG. 4k, after the fourth surface has been consumed, the pointer for the next segment (the first segment of the fifth row of raster scan data, pixels P65 through P68) can be stored in the upper left section of the reformatting logic's register space 212 (akin to FIG. 4a) and the entire process repeats, e.g., for raster scan rows 5 through 8 of the input image.

A few observations are worth mentioning concerning the example described just above with respect to FIGS. 4a through 4k. Firstly, note that the actual pointer values, which correspond, e.g., to memory addresses within the shared storage pool, can be random or otherwise have little or no relationship. As such, the segments may be physically stored in random locations within the shared storage pool 210. The organized arrangement of the stored segments as observed in FIGS. 4a through 4k are therefore a consequence of the organization of the pointer values in the reformatting logic's register space 212 as opposed to any organization of the segments as physically stored within the shared storage pool 210. That is, the ability to recognize block images for stencil processor consumption is a consequence of the logical organization of the pointer values within the reformatting logic's register space 212, rather than any organization of the physical locations in the storage pool 210 where the segments are actually stored. Here, consistent with this observation, the storage pool's list can essentially list pointers in random order.

A second observation is that the size of a block image deemed sufficient for stencil processor consumption can be larger than the stencil size that a stencil processor will utilize when processing the image data within the block. For example, in a more realistic embodiment that departs from the specific dimensions used for the example of FIGS. 4a through 4k, the execution lane array and two-dimensional shift register array have dimensions of 16×16. When the two-dimensional shift register array is fully loaded with a block image of pixel dimension 16×16, the execution lane array may then proceed to process that block image with stencil sizes of any of the following pixel dimensions: 2×2, 3×3, 4×4, etc. Here, the stencil size dictates the amount of shifting performed by the two dimensional shift register. Thus the block that is identified by the reformatting logic and forwarded for processing by a stencil processor is more about loading the stencil processor's shift register array than about the stencil size used to operate on the image data.

Another observation is that the example described above with respect to FIGS. 4a through 4k assumed that each block that was extracted from the storage pool by the reformatting logic was sufficient to load a stencil processor for further operations. In various embodiments, each block that is extracted by the reformatting logic may contain multiple blocks for loading into a stencil processor. For example, consider a stencil processor whose execution lane array and two dimensional shift register array are of dimension 8×8. Here, the reformatting logic may identify blocks having 8 rows and a width of 16 pixels. In this case, the reformatting logic is forwarding two blocks for stencil consumption per forwarded area. A line buffer unit or logic associated with the stencil processor that is to process the block breaks the block down into a pair of 8×8 blocks that are individually loaded into the stencil processor. Thus, the size of a block that is extracted by the reformatting logic need not be the same dimension as the block of an image that is loaded into a stencil processor.

Yet another observation is that in various embodiments the register space of the reformatting logic is configured to have a height dimension equal to the block image to be extracted. In the embodiment of FIGS. 4a through 4i, the block image being extracted has a height dimension of four pixels. As such, the register space 212 is organized to keep four rows of pointers. By contrast, in various embodiments, the register space 212 is organized to have a length dimension equal to the dimension of raster scan row of the input image data normalized by the segment size. In the embodiment of FIGS. 4a through 4i, the segment size is 4 pixels and the input image data has a raster scan row dimension of 16 pixels. As such, the register space 212 is organized to have a length dimension of (16 pixels/row)/(4 pixels/segment)=4 segments/row.

In various embodiments, the I/O unit 207 is able to concurrently support a plurality of input image streams. That is, for instance, a first raster scan image may be received and corresponding blocks forwarded to, e.g., a first line buffer unit, while, a second raster scan image may be received and corresponding blocks forwarded to, e.g., a second line buffer unit. Each such stream and corresponding reformatting for a particular line buffer unit may be referred to as a channel. The shared storage pool 210 is therefore a "shared" pool because its storage resources are shared by the number of live channels supported by the I/O unit 207. That is, the segments of different channels are concurrently stored within the pool 210.

With the I/O unit 207 designed to concurrently handle multiple channels, the reformatting logic 211 includes logic circuitry to track pointer values in its internal register space 212 for each of the channels. In various embodiments, the reformatting logic 211 includes sufficient register space 212 to handle a worst case condition (a maximum number of concurrent channels having maximum supported raster scan row pixel length and maximum extracted block pixel height). Furthermore the register space 212 resources within the reformatting logic 211 are configurable by the reformatting logic's logic circuitry to enable different numbers of concurrently supported channels, different raster scan row pixel widths and/or different extracted block pixel heights. Here, each live channel may be defined in the reformatting logic 211 by configuration register space of the reformatting logic 211 that defines, for a particular channel, which line buffer unit is to receive the channel's extracted blocks, the dimensions of the extracted blocks, the row pixel width of the incoming raster scan input image stream, etc.

Another observation is that, in the example of FIGS. 4a through 4i, the input rate of segments is slower than the output rate of extracted blocks. More specifically, four segments of extracted surface area data can be read from the shared storage pool 210 in an amount of time that approximately corresponds to the rate at which one segment's worth of new input pixel values are written into the shared storage pool 210.

FIGS. 5a through 5i pertain to another situation in which the rate at which segments are read from the storage pool 210 is approximately equal to the rate at which segments are written into the storage pool. That is, e.g., the rate at which input data is being received is 4× the rate of the example of FIGS. 4a through 4i. As will be more clear from the following discussion, a double buffered approach is utilized within the reformatting logic's register space 212 to handle the faster input data rate.

FIG. 5a corresponds to the state of FIG. 4g when the first block is realizable from the received input raster scan data. For ease of drawing, pointer values are not shown in the reformatting logic's register space.

FIGS. 5b through 5e show that with each segment being read from the shared storage pool for forwarding as part of a block image, a new segment is written into the storage pool 210. That is, each next figure from FIG. 5a through FIG. 5e show the removal of a next segment from the first column of the first buffer and the addition of next segment along the fourth row of the first buffer 501. As a consequence, when the fourth segment (containing pixels 49 through 52) is read from the first column of the first buffer 501 in FIG. 5e, the next segment of input data (containing pixels 65 through 68) needs to be written in the upper left hand corner location of the second buffer 502 of the reformatting logic's pointer register space 212. Thus, as will be seen in the following figures, the next three blocks to be extracted have their pointers in the first buffer 501 but the pointer values for subsequent input data segments will have their pointers stored in the second buffer 502.

Figure 5F:
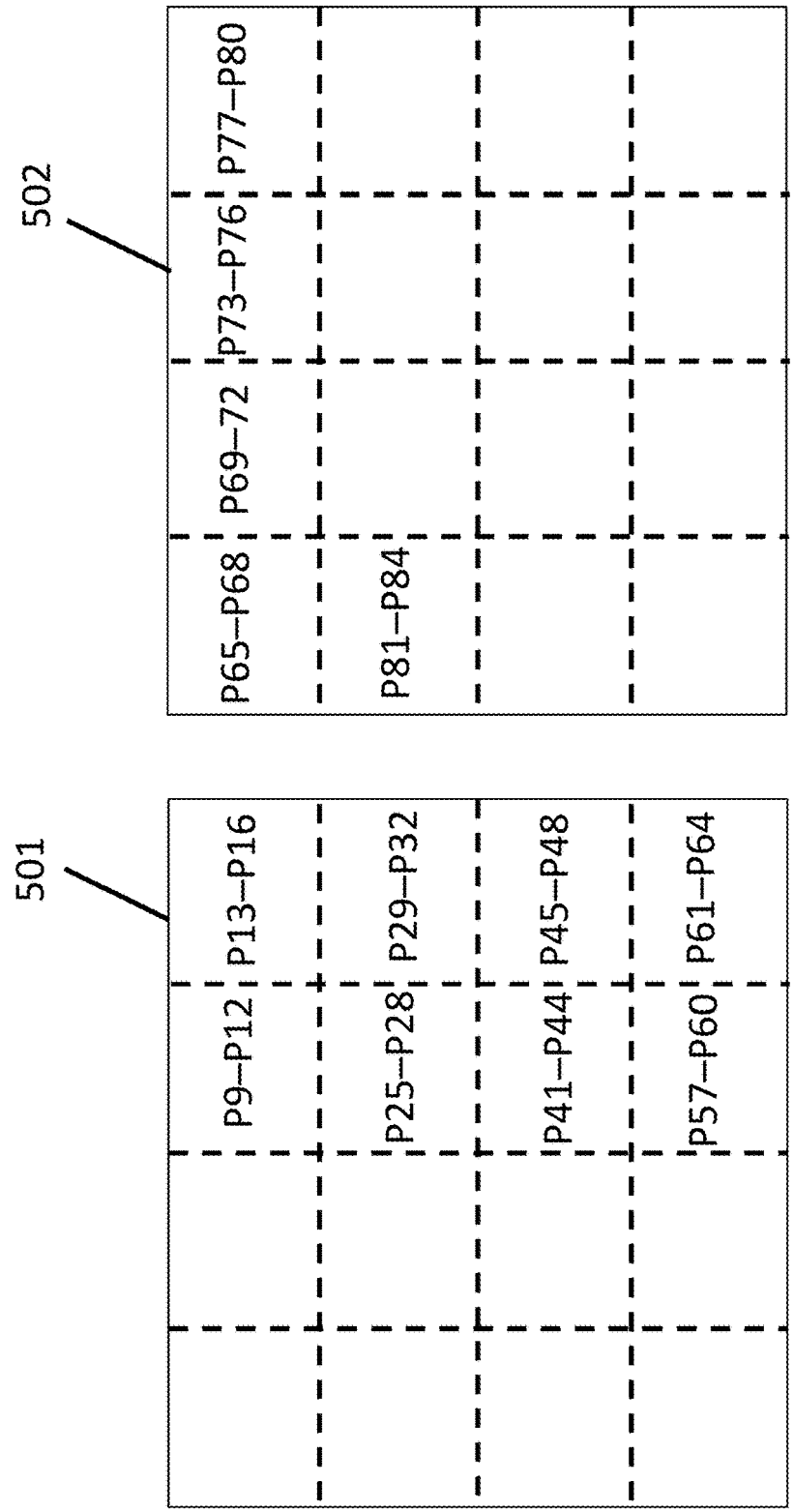
Figure 5G:
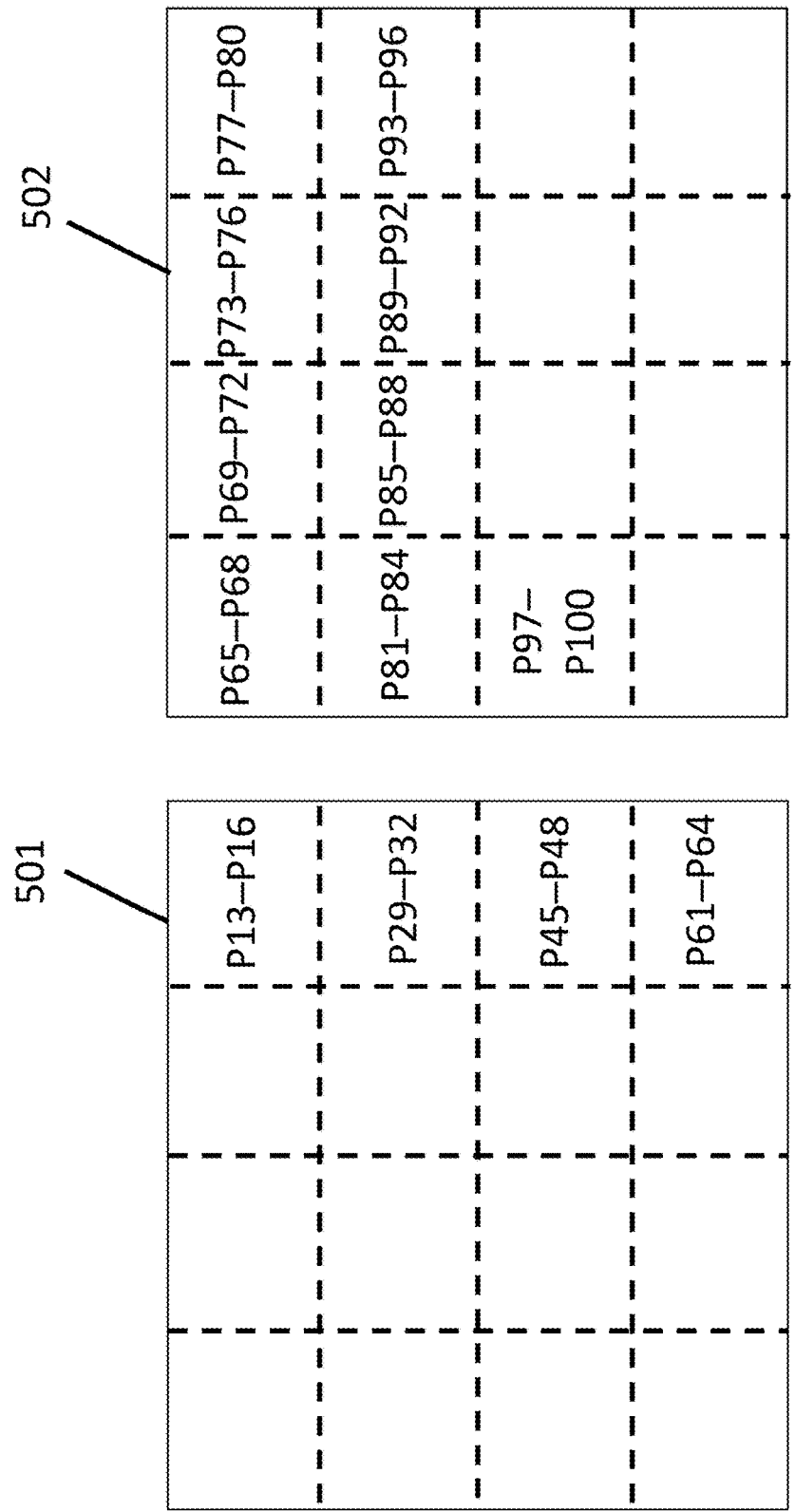
Figure 5H:
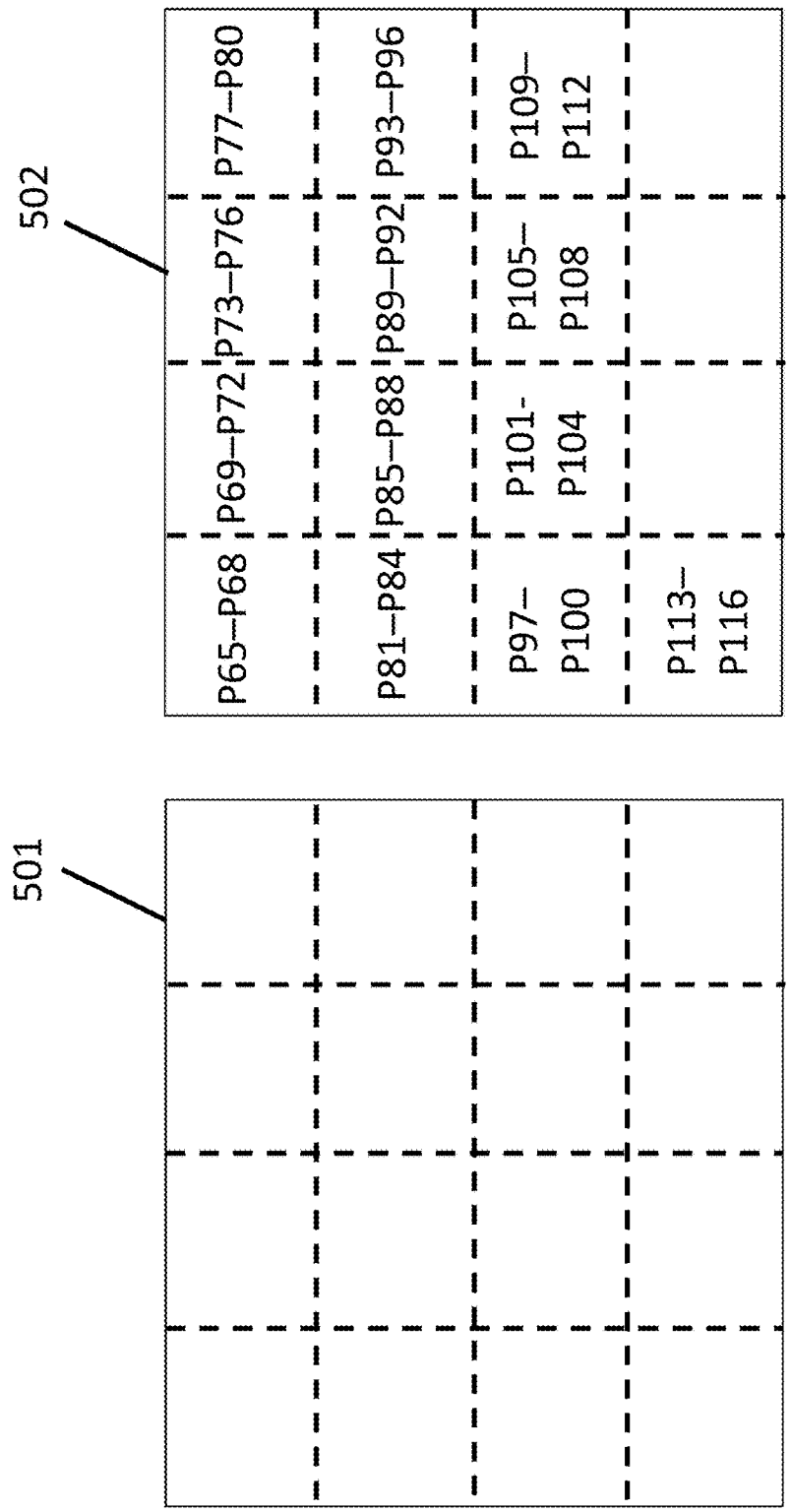

FIGS. 5f through 5h show subsequent system state at four cycle increments. That is, FIG. 5f shows the system state four cycles later after the four segments of the second column of the first buffer 501 have been read from the shared storage pool (to construct the second block image to be forwarded to a line buffer unit) and the next four input data segments have been received and their pointer values stored in the second buffer. FIG. 5g shows the system state a further four cycles later after the four segments of the third column in the first buffer 501 have been read from the shared storage pool (to construct the third block image to be forwarded to the line buffer unit) and the next four input data segments have been received and their pointer values stored in the second buffer 502. FIG. 5h shows the system state another four cycles later after the four segments of the fourth column of the first buffer 501 have been read from the shared storage pool (to construct the fourth block image to be forwarded to the line buffer unit) and the next four input data segments have been received and their pointer values stored in the second buffer 502.

Figure 5I:
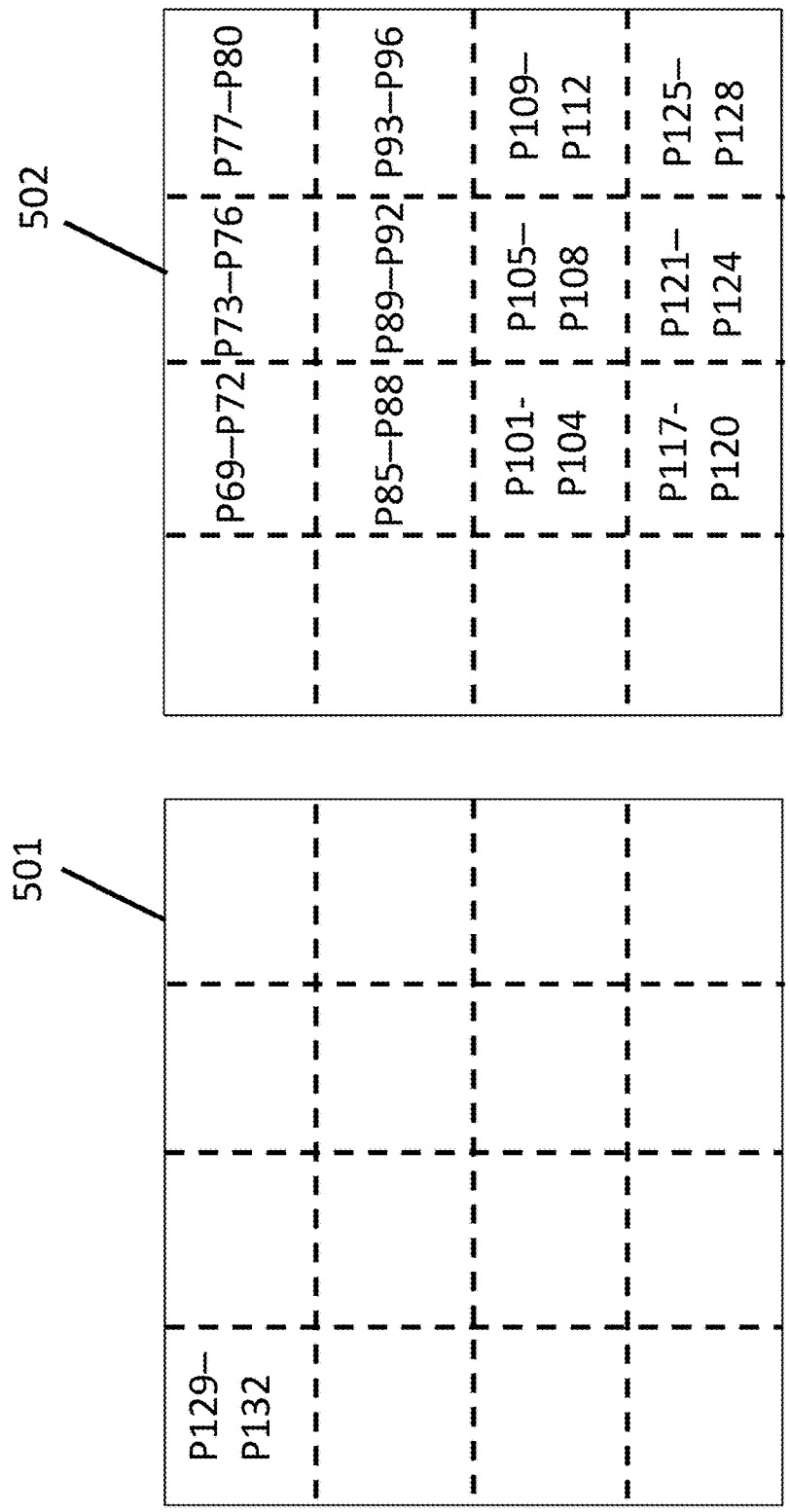

FIG. 5i shows the system state another four cycles later when the fifth column of image data has been read from the shared storage pool (to construct the fifth block image to be forwarded to the line buffer unit) and the next four input data segments have been received and their pointer values stored in the reformatting logic's register space.

Note that the fifth column resides in the second buffer 502 whereas the first four columns resided in the first buffer 501. Additionally, note that the fourth segment to be received (for pixels 129 through 132) has its pointer value stored in the upper left hand corner of the first buffer 501. Thus, going forward, the next three blocks to be extracted have their pointer values in the second buffer 502 but pointers for new input data segments will be stored in the first buffer 501. The process then repeats with the state of FIG. 5a (in terms of valid pointer concentration not pixel value) being reached when the surface image for the fourth column of the second buffer 502 is extracted.

Referring back to FIG. 2, upon the one or more stencil processors 202_1 through 202_N completing their respective processing on the input image data, output image data is passed from the stencil processor(s) 202 through the network 204 to one or more corresponding line buffer units 205_1 through 205_N. The one or more line buffer units 205_1 through 205_N then forward the output image data to the image processor's I/O unit 207.

In this case, blocks are passed from a line buffer unit to the I/O unit 207. The I/O unit then writes the blocks in the shared storage pool. Output data that is sent externally from the image processor can then be directly read out as blocks or read out in raster scan format. In the case of the later where output data is read out in raster scan format, the block to raster scan conversion is accomplished by a process that is the reverse of the input reformatting processes discussed at length above. That is, once a consecutive number of output blocks have been written (segment by segment) into the shared storage pool that correspond to the full width of a raster scan output row, a number of rows equal to the height of the blocks can be read out in order segment by segment.

FIG. 6 shows a method performed by an I/O unit. The method includes storing input image data received in a raster scan format as segments within a storage circuit 601. The method also includes reformatting the input image data into a block image format by reading certain ones of the segments from the storage circuit 602. The method also includes processing the block image formatted input image data with a processor comprising a two-dimensional execution lane array and a two-dimensional shift register array 603.

Image Processor and Stencil Processor Embodiments

FIG. 7 shows an embodiment of an architecture 700 for an image processor implemented in hardware as described above. The image processor may be targeted, for example, by a compiler that converts program code written for a virtual processor within a simulated environment into program code that is actually executed by the hardware processor. As observed in FIG. 7, the architecture 700 includes a plurality of line buffer units 701_1 through 701_M interconnected to a plurality of stencil processor units 702_1 through 702_N and corresponding sheet generator units 703_1 through 703_N through a network 704 (e.g., a network on chip (NOC) including an on chip switch network, an on chip ring network or other kind of network). In an embodiment, any line buffer unit may connect to any sheet generator and corresponding stencil processor through the network 704.

In an embodiment, program code is compiled and loaded onto a corresponding stencil processor 702 to perform the image processing operations earlier defined by a software developer (program code may also be loaded onto the stencil processor's associated sheet generator 703, e.g., depending on design and implementation). In at least some instances an image processing pipeline may be realized by loading a first kernel program for a first pipeline stage into a first stencil processor 702_1, loading a second kernel program for a second pipeline stage into a second stencil processor 702_2, etc. where the first kernel performs the functions of the first stage of the pipeline, the second kernel performs the functions of the second stage of the pipeline, etc. and additional control flow methods are installed to pass output image data from one stage of the pipeline to the next stage of the pipeline.

In other configurations, the image processor may be realized as a parallel machine having two or more stencil processors 702_1, 702_2 operating the same kernel program code. For example, a highly dense and high data rate stream of image data may be processed by spreading frames across multiple stencil processors each of which perform the same function.

In yet other configurations, essentially any DAG of kernels may be loaded onto the hardware processor by configuring respective stencil processors with their own respective kernel of program code and configuring appropriate control flow hooks into the hardware to direct output images from one kernel to the input of a next kernel in the DAG design.

As a general flow, frames of image data are received by a macro I/O unit 705 and passed to one or more of the line buffer units 701 on a frame by frame basis. In various embodiments where the macro I/O unit 705 is implemented akin to the I/O unit 207 discussed at length above, an individual frame is passed from the macro I/O unit 705 to the one or more line buffer units as a series of blocks of image data, e.g., each containing a different section of the frame's image. A particular line buffer unit parses its frame of image data into a smaller region of image data, referred to as "a line group", and then passes the line group through the network 704 to a particular sheet generator. A complete or "full" singular line group may be composed, for example, with the data of multiple contiguous complete rows or columns of a frame (for simplicity the present specification will mainly refer to contiguous rows). The sheet generator further parses the line group of image data into a smaller region of image data, referred to as a "sheet", and presents the sheet to its corresponding stencil processor.

In the case of an image processing pipeline or a DAG flow having a single input, generally, input frames are directed to the same line buffer unit 701_1 which parses the image data into line groups and directs the line groups to the sheet generator 703_1 whose corresponding stencil processor 702_1 is executing the code of the first kernel in the pipeline/DAG. Upon completion of operations by the stencil processor 702_1 on the line groups it processes, the sheet generator 703_1 sends output line groups to a "downstream" line buffer unit 701_2 (in some use cases the output line group may be sent back to the same line buffer unit 701_1 that earlier had sent the input line groups).

One or more "consumer" kernels that represent the next stage/operation in the pipeline/DAG executing on their own respective other sheet generator and stencil processor (e.g., sheet generator 703_2 and stencil processor 702_2) then receive from the downstream line buffer unit 701_2 the image data generated by the first stencil processor 702_1. In this manner, a "producer" kernel operating on a first stencil processor has its output data forwarded to a "consumer" kernel operating on a second stencil processor where the consumer kernel performs the next set of tasks after the producer kernel consistent with the design of the overall pipeline or DAG.

A stencil processor 702 is designed to simultaneously operate on multiple overlapping stencils of image data. The multiple overlapping stencils and internal hardware processing capacity of the stencil processor effectively determines the size of a sheet. Here, within a stencil processor 702, arrays of execution lanes operate in unison to simultaneously process the image data surface area covered by the multiple overlapping stencils.

As will be described in more detail below, in various embodiments, sheets of image data are loaded into a two-dimensional register array structure within the stencil processor 702. The use of sheets and the two-dimensional register array structure is believed to effectively provide for power consumption improvements by moving a large amount of data into a large amount of register space as, e.g., a single load operation with processing tasks performed directly on the data immediately thereafter by an execution lane array. Additionally, the use of an execution lane array and corresponding register array provide for different stencil sizes that are easily programmable/configurable.

FIGS. 8a through 8e illustrate at a high level embodiments of both the parsing activity of a line buffer unit 701, the finer grained parsing activity of a sheet generator unit 703 as well as the stencil processing activity of the stencil processor 702 that is coupled to the sheet generator unit 703.

FIG. 8a depicts an embodiment of an input frame of image data 801. FIG. 8a also depicts an outline of three overlapping stencils 802 (each having a dimension of 3 pixels×3 pixels) that a stencil processor is designed to operate over. The output pixel that each stencil respectively generates output image data for is highlighted in solid black. For simplicity, the three overlapping stencils 802 are depicted as overlapping only in the vertical direction. It is pertinent to recognize that in actuality a stencil processor may be designed to have overlapping stencils in both the vertical and horizontal directions.

Because of the vertical overlapping stencils 802 within the stencil processor, as observed in FIG. 8a, there exists a wide band of image data within the frame that a single stencil processor can operate over. As will be discussed in more detail below, in an embodiment, the stencil processors process data within their overlapping stencils in a left to right fashion across the image data (and then repeat for the next set of lines, in top to bottom order). Thus, as the stencil processors continue forward with their operation, the number of solid black output pixel blocks will grow right-wise horizontally. As discussed above, a line buffer unit 701 is responsible for parsing a line group of input image data from an incoming frame that is sufficient for the stencil processors to operate over for an extended number of upcoming cycles. An exemplary depiction of a line group is illustrated as a shaded region 803. In an embodiment, the line buffer unit 701 can comprehend different dynamics for sending/receiving a line group to/from a sheet generator. For example, according to one mode, referred to as "full group", the complete full width lines of image data are passed between a line buffer unit and a sheet generator. According to a second mode, referred to as "virtually tall", a line group is passed initially with a subset of full width rows. The remaining rows are then passed sequentially in smaller (less than full width) pieces.

With the line group 803 of the input image data having been defined by the line buffer unit and passed to the sheet generator unit, the sheet generator unit further parses the line group into finer sheets that are more precisely fitted to the hardware limitations of the stencil processor. More specifically, as will be described in more detail further below, in an embodiment, each stencil processor consists of a two dimensional shift register array. The two dimensional shift register array essentially shifts image data "beneath" an array of execution lanes where the pattern of the shifting causes each execution lane to operate on data within its own respective stencil (that is, each execution lane processes on its own stencil of information to generate an output for that stencil). In an embodiment, sheets are surface areas of input image data that "fill" or are otherwise loaded into the two dimensional shift register array.

As will be described in more detail below, in various embodiments, there are actually multiple layers of two dimensional register data that can be shifted on any cycle. For convenience, much of the present description will simply use the term "two-dimensional shift register" and the like to refer to structures that have one or more such layers of two-dimensional register data that can be shifted.

Figure 8C:
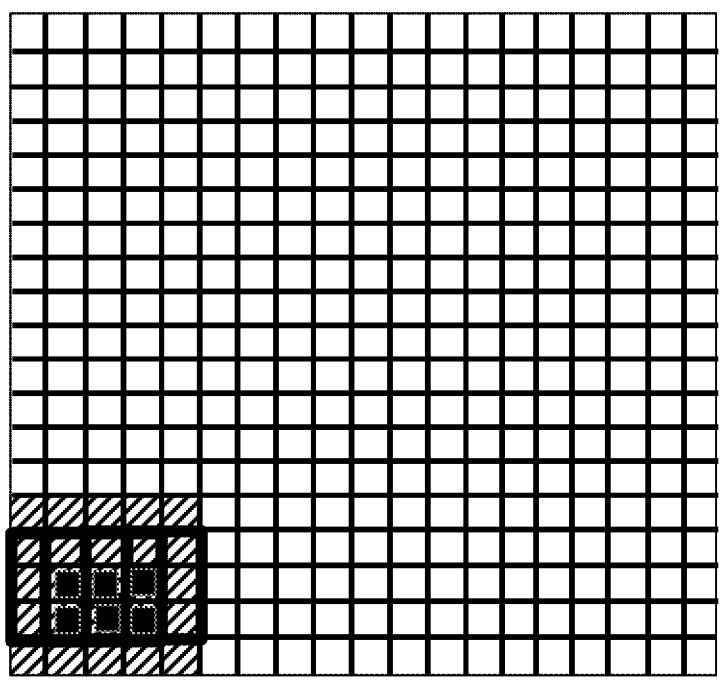
Figure 8D:
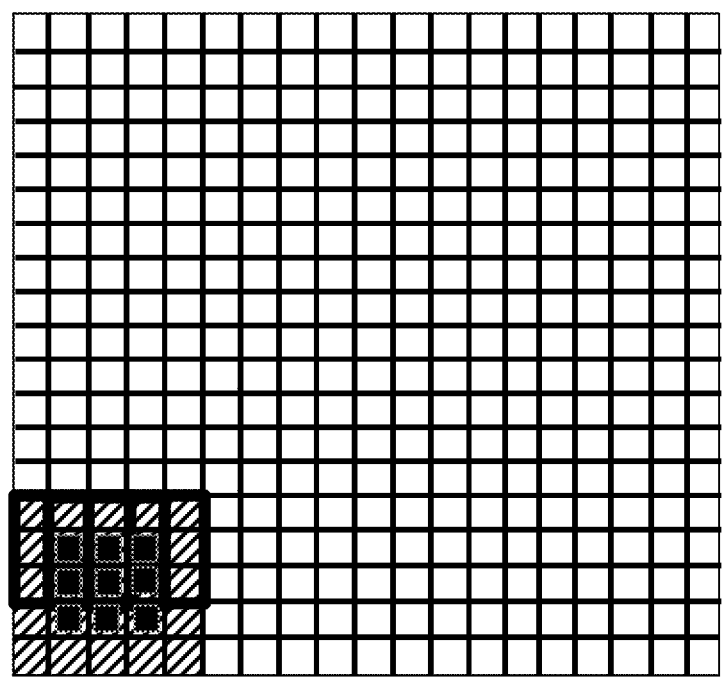

Thus, as observed in FIG. 8b, the sheet generator parses an initial sheet 804 from the line group 803 and provides it to the stencil processor (here, the sheet of data corresponds to the shaded region that is generally identified by reference number 804). As observed in FIGS. 8c and 8d, the stencil processor operates on the sheet of input image data by effectively moving the overlapping stencils 802 in a left to right fashion over the sheet. As of FIG. 8d, the number of pixels for which an output value could be calculated from the data within the sheet is exhausted (no other pixel positions can have an output value determined from the information within the sheet). For simplicity the border regions of the image have been ignored.

As observed in FIG. 8e the sheet generator then provides a next sheet 805 for the stencil processor to continue operations on. Note that the initial positions of the stencils as they begin operation on the next sheet is the next progression to the right from the point of exhaustion on the first sheet (as depicted previously in FIG. 8d). With the new sheet 805, the stencils will simply continue moving to the right as the stencil processor operates on the new sheet in the same manner as with the processing of the first sheet.

Note that there is some overlap between the data of the first sheet 804 and the data of the second sheet 805 owing to the border regions of stencils that surround an output pixel location. The overlap could be handled simply by the sheet generator re-transmitting the overlapping data twice. In alternate implementations, to feed a next sheet to the stencil processor, the sheet generator may proceed to only send new data to the stencil processor and the stencil processor reuses the overlapping data from the previous sheet.

FIG. 9a shows an embodiment of a stencil processor architecture 900. As observed in FIG. 9a, the stencil processor includes a data computation unit 901, a scalar processor 902 and associated memory 903 and an I/O unit 904. The data computation unit 901 includes an array of execution lanes 905, a two-dimensional shift array structure 906 and separate random access memories 907 associated with specific rows or columns of the array.

The I/O unit 904 is responsible for loading "input" sheets of data received from the sheet generator into the data computation unit 901 and storing "output" sheets of data from the stencil processor into the sheet generator. In an embodiment the loading of sheet data into the data computation unit 901 entails parsing a received sheet into rows/columns of image data and loading the rows/columns of image data into the two dimensional shift register structure 906 or respective random access memories 907 of the rows/columns of the execution lane array (described in more detail below). If the sheet is initially loaded into memories 907, the individual execution lanes within the execution lane array 905 may then load sheet data into the two-dimensional shift register structure 906 from the random access memories 907 when appropriate (e.g., as a load instruction just prior to operation on the sheet's data). Upon completion of the loading of a sheet of data into the register structure 906 (whether directly from a sheet generator or from memories 907), the execution lanes of the execution lane array 905 operate on the data and eventually "write back" finished data as a sheet directly back to the sheet generator, or, into the random access memories 907. If the later the I/O unit 904 fetches the data from the random access memories 907 to form an output sheet which is then forwarded to the sheet generator.

The scalar processor 902 includes a program controller 909 that reads the instructions of the stencil processor's program code from scalar memory 903 and issues the instructions to the execution lanes in the execution lane array 905. In an embodiment, a single same instruction is broadcast to all execution lanes within the array 905 to effect a SIMD-like behavior from the data computation unit 901. In an embodiment, the instruction format of the instructions read from scalar memory 903 and issued to the execution lanes of the execution lane array 905 includes a very-long-instruction-word (VLIW) type format that includes more than one opcode per instruction. In a further embodiment, the VLIW format includes both an ALU opcode that directs a mathematical function performed by each execution lane's ALU (which, as described below, in an embodiment may specify more than one traditional ALU operation) and a memory opcode (that directs a memory operation for a specific execution lane or set of execution lanes).

The term "execution lane" refers to a set of one or more execution units capable of executing an instruction (e.g., logic circuitry that can execute an instruction). An execution lane can, in various embodiments, include more processor-like functionality beyond just execution units, however. For example, besides one or more execution units, an execution lane may also include logic circuitry that decodes a received instruction, or, in the case of more MIMD-like designs, logic circuitry that fetches and decodes an instruction. With respect to MIMD-like approaches, although a centralized program control approach has largely been described herein, a more distributed approach may be implemented in various alternative embodiments (e.g., including program code and a program controller within each execution lane of the array 905).

The combination of an execution lane array 905, program controller 909 and two dimensional shift register structure 906 provides a widely adaptable/configurable hardware platform for a broad range of programmable functions. For example, application software developers are able to program kernels having a wide range of different functional capability as well as dimension (e.g., stencil size) given that the individual execution lanes are able to perform a wide variety of functions and are able to readily access input image data proximate to any output array location.

Apart from acting as a data store for image data being operated on by the execution lane array 905, the random access memories 907 may also keep one or more look-up tables. In various embodiments one or more scalar look-up tables may also be instantiated within the scalar memory 903.

A scalar look-up involves passing the same data value from the same look-up table from the same index to each of the execution lanes within the execution lane array 905. In various embodiments, the VLIW instruction format described above is expanded to also include a scalar opcode that directs a look-up operation performed by the scalar processor into a scalar look-up table. The index that is specified for use with the opcode may be an immediate operand or fetched from some other data storage location. Regardless, in an embodiment, a look-up from a scalar look-up table within scalar memory essentially involves broadcasting the same data value to all execution lanes within the execution lane array 905 during the same clock cycle. Additional details concerning use and operation of look-up tables is provided further below.

FIG. 9b summarizes the VLIW instruction word embodiments(s) discussed above. As observed in FIG. 9b, the VLIW instruction word format includes fields for three separate instructions: 1) a scalar instruction 951 that is executed by the scalar processor; 2) an ALU instruction 952 that is broadcasted and executed in SIMD fashion by the respective ALUs within the execution lane array; and, 3) a memory instruction 953 that is broadcasted and executed in a partial SIMD fashion (e.g., if execution lanes along a same row in the execution lane array share a same random access memory, then one execution lane from each of the different rows actually execute the instruction (the format of the memory instruction 953 may include an operand that identifies which execution lane from each row executes the instruction).

A field 954 for one or more immediate operands is also included. Which of the instructions 951, 952, 953 use which immediate operand information may be identified in the instruction format. Each of instructions 951, 952, 953 also include their own respective input operand and resultant information (e.g., local registers for ALU operations and a local register and a memory address for memory access instructions). In an embodiment, the scalar instruction 951 is executed by the scalar processor before the execution lanes within the execution lane array execute either of the other to instructions 952, 953. That is, the execution of the VLIW word includes a first cycle upon which the scalar instruction 951 is executed followed by a second cycle upon with the other instructions 952, 953 may be executed (note that in various embodiments instructions 952 and 953 may be executed in parallel).

In an embodiment, the scalar instructions executed by the scalar processor include commands issued to the sheet generator to load/store sheets from/into the memories or 2D shift register of the data computation unit. Here, the sheet generator's operation can be dependent on the operation of the line buffer unit or other variables that prevent pre-runtime comprehension of the number of cycles it will take the sheet generator to complete any command issued by the scalar processor. As such, in an embodiment, any VLIW word whose scalar instruction 951 corresponds to or otherwise causes a command to be issued to the sheet generator also includes no-operation (NOOP) instructions in the other two instruction field 952, 953. The program code then enters a loop of NOOP instructions for instruction fields 952, 953 until the sheet generator completes its load/store to/from the data computation unit. Here, upon issuing a command to the sheet generator, the scalar processor may set a bit of an interlock register that the sheet generator resets upon completion of the command. During the NOOP loop the scalar processor monitors the bit of the interlock bit. When the scalar processor detects that the sheet generator has completed its command normal execution begins again.

FIG. 10 shows an embodiment of a data computation component 1001. As observed in FIG. 10, the data computation component 1001 includes an array of execution lanes 1005 that are logically positioned "above" a two-dimensional shift register array structure 1006. As discussed above, in various embodiments, a sheet of image data provided by a sheet generator is loaded into the two-dimensional shift register 1006. The execution lanes then operate on the sheet data from the register structure 1006.

The execution lane array 1005 and shift register structure 1006 are fixed in position relative to one another. However, the data within the shift register array 1006 shifts in a strategic and coordinated fashion to cause each execution lane in the execution lane array to process a different stencil within the data. As such, each execution lane determines the output image value for a different pixel in the output sheet being generated. From the architecture of FIG. 10 it should be clear that overlapping stencils are not only arranged vertically but also horizontally as the execution lane array 1005 includes vertically adjacent execution lanes as well as horizontally adjacent execution lanes.

Some notable architectural features of the data computation unit 1001 include the shift register structure 1006 having wider dimensions than the execution lane array 1005. That is, there is a "halo" of registers 1009 outside the execution lane array 1005. Although the halo 1009 is shown to exist on two sides of the execution lane array, depending on implementation, the halo may exist on less (one) or more (three or four) sides of the execution lane array 1005. The halo 1005 serves to provide "spill-over" space for data that spills outside the bounds of the execution lane array 1005 as the data is shifting "beneath" the execution lanes 1005. As a simple case, a 5×5 stencil centered on the right edge of the execution lane array 1005 will need four halo register locations further to the right when the stencil's leftmost pixels are processed. For ease of drawing, FIG. 10 shows the registers of the right side of the halo as only having horizontal shift connections and registers of the bottom side of the halo as only having vertical shift connections when, in a nominal embodiment, registers on either side (right, bottom) would have both horizontal and vertical connections. In various embodiments, the halo region does not include corresponding execution lane logic to execute image processing instructions (e.g., no ALU is present). However, individual memory access units (M) are present in each of the halo region locations so that the individual halo register locations can individually load data from memory and store data to memory.

Additional spill-over room is provided by random access memories 1007 that are coupled to each row and/or each column in the array, or portions thereof (E.g., a random access memory may be assigned to a "region" of the execution lane array that spans 4 execution lanes row wise and 2 execution lanes column wise. For simplicity the remainder of the application will refer mainly to row and/or column based allocation schemes). Here, if a execution lane's kernel operations require it to process pixel values outside of the two-dimensional shift register array 1006 (which some image processing routines may require) the plane of image data is able to further spill-over, e.g., from the halo region 1009 into random access memory 1007. For example, consider a 6×6 stencil where the hardware includes a halo region of only four storage elements to the right of a execution lane on the right edge of the execution lane array. In this case, the data would need to be shifted further to the right off the right edge of the halo 1009 to fully process the stencil. Data that is shifted outside the halo region 1009 would then spill-over to random access memory 1007. Other applications of the random access memories 1007 and the stencil processor of FIG. 9 are provided further below.

FIGS. 11a through 11k demonstrate a working example of the manner in which image data is shifted within the two dimensional shift register array "beneath" the execution lane array as alluded to above. As observed in FIG. 11a, the data contents of the two dimensional shift array are depicted in a first array 1107 and the execution lane array is depicted by a frame 1105. Also, two neighboring execution lanes 1110 within the execution lane array are simplistically depicted. In this simplistic depiction 1110, each execution lane includes a register R1 that can accept data from the shift register, accept data from an ALU output (e.g., to behave as an accumulator across cycles), or write output data into an output destination.

Each execution lane also has available, in a local register R2, the contents "beneath" it in the two dimensional shift array. Thus, R1 is a physical register of the execution lane while R2 is a physical register of the two dimensional shift register array. The execution lane includes an ALU that can operate on operands provided by R1 and/or R2. As will be described in more detail further below, in an embodiment the shift register is actually implemented with multiple (a "depth" of) storage/register elements per array location but the shifting activity is limited to one plane of storage elements (e.g., only one plane of storage elements can shift per cycle). FIGS. 11a through 11k depict one of these deeper register locations as being used to store the resultant X from the respective execution lanes. For illustrative ease the deeper resultant register is drawn alongside rather than beneath its counterpart register R2.

FIGS. 11a through 11k focus on the calculation of two stencils whose central position is aligned with the pair of execution lane positions 1111 depicted within the execution lane array. For ease of illustration, the pair of execution lanes 1110 are drawn as horizontal neighbors when in fact, according to the following example, they are vertical neighbors.

Figure 11B:
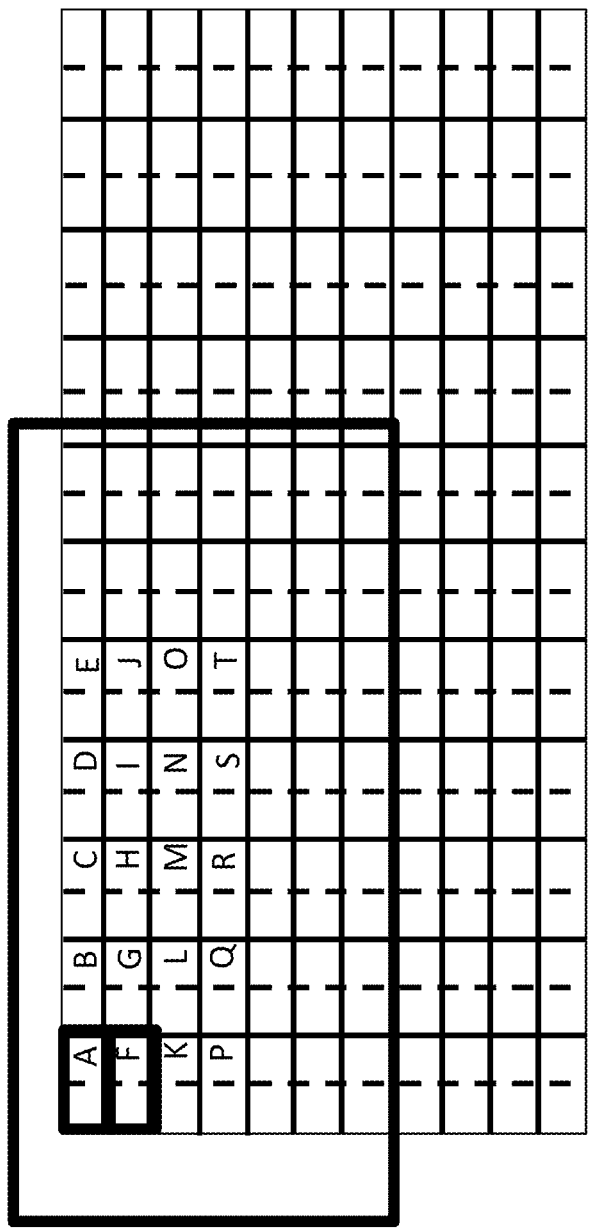

As observed initially in FIG. 11a, the execution lanes are centered on their central stencil locations. FIG. 11b shows the object code executed by both execution lanes. As observed in FIG. 11b the program code of both execution lanes causes the data within the shift register array to shift down one position and shift right one position. This aligns both execution lanes to the upper left hand corner of their respective stencils. The program code then causes the data that is located (in R2) in their respective locations to be loaded into R1.

Figure 11C:
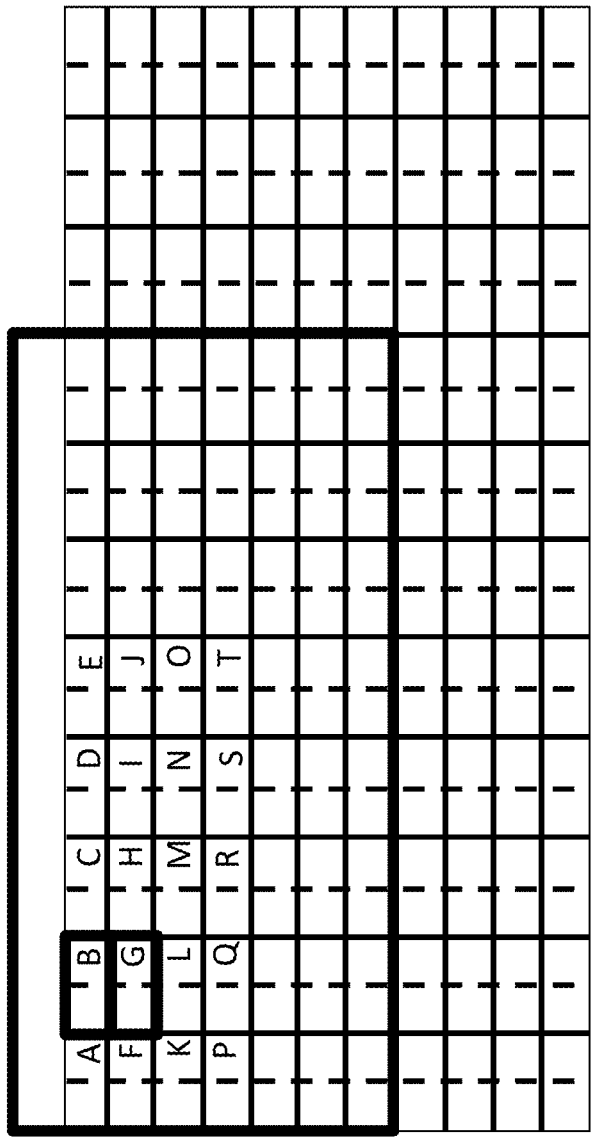
Figure 11D:
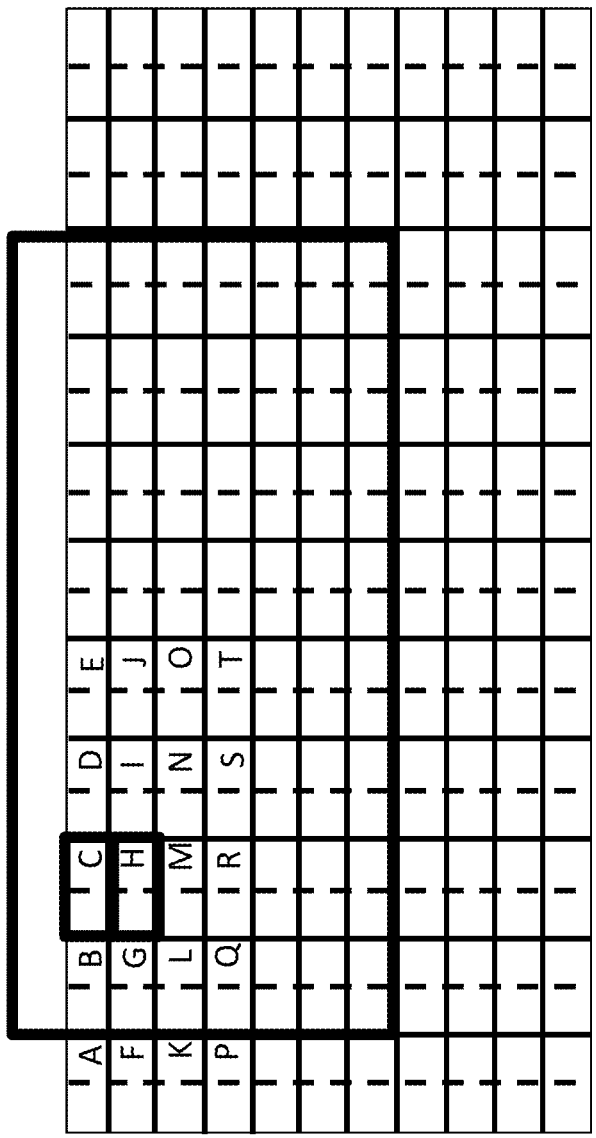

As observed in FIG. 11c the program code next causes the pair of execution lanes to shift the data within the shift register array one unit to the left which causes the value to the right of each execution lane's respective position to be shifted into each execution lane' position. The value in R1 (previous value) is then added with the new value that has shifted into the execution lane's position (in R2). The resultant is written into R1. As observed in FIG. 11d the same process as described above for FIG. 11c is repeated which causes the resultant R1 to now include the value A+B+C in the upper execution lane and F+G+H in the lower execution lane. At this point both execution lanes have processed the upper row of their respective stencils. Note the spill-over into a halo region on the left side of the execution lane array (if one exists on the left hand side) or into random access memory if a halo region does not exist on the left hand side of the execution lane array.

Figure 11E:
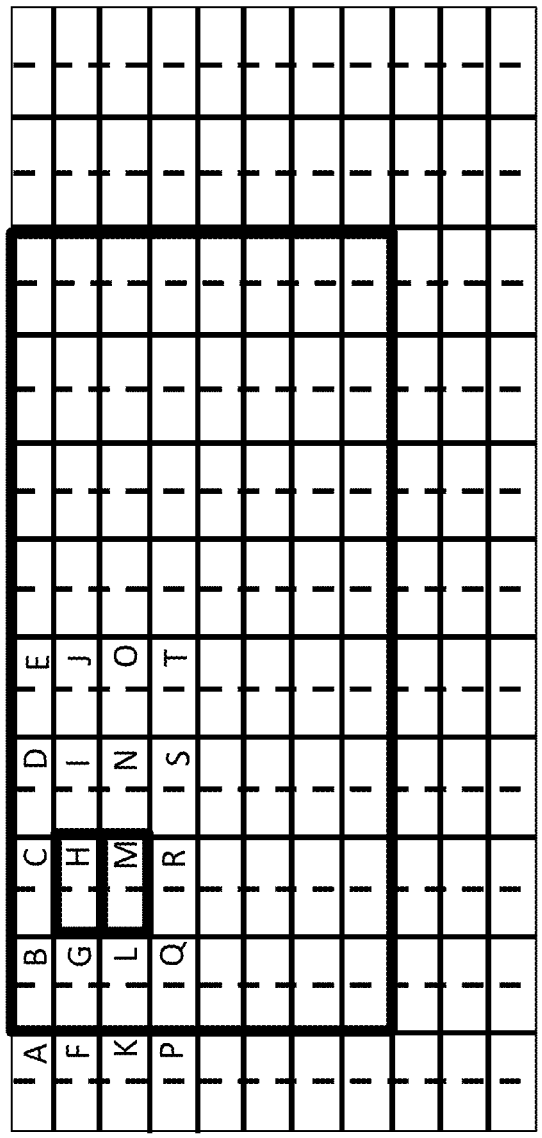
Figure 11F:
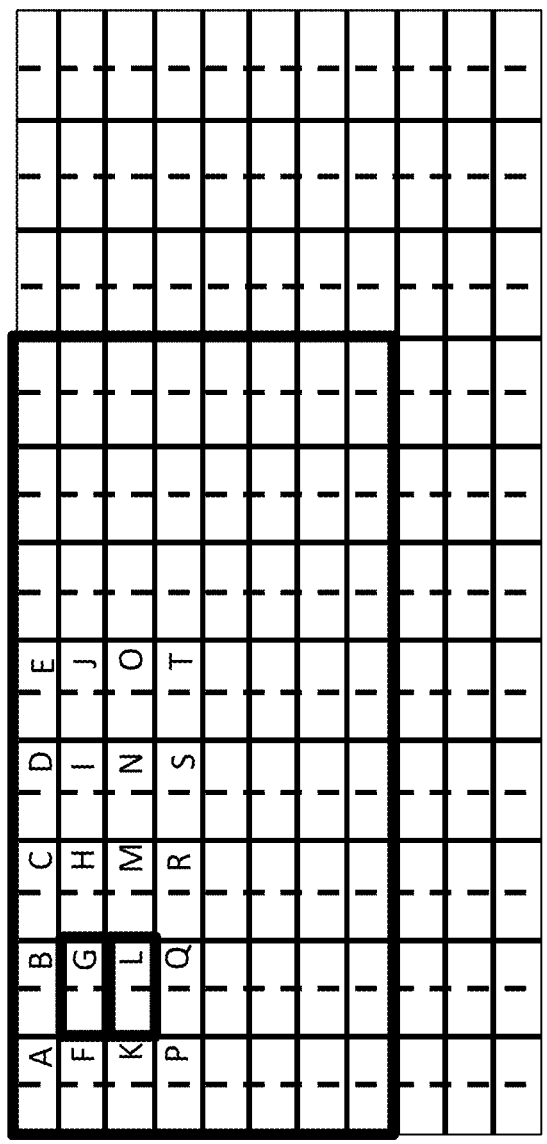
Figure 11G:
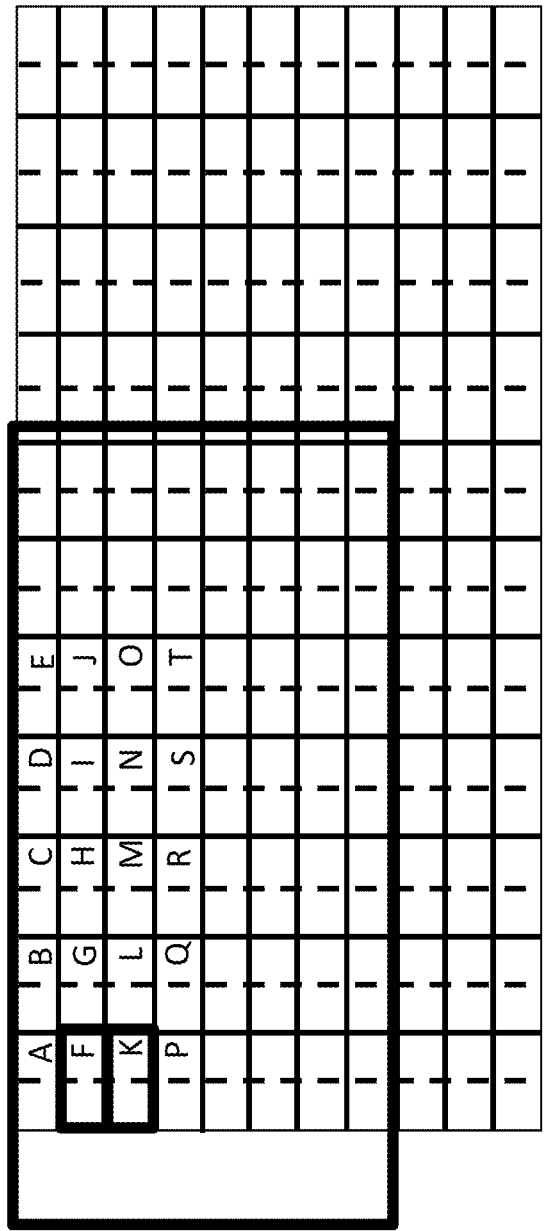

As observed in FIG. 11e, the program code next causes the data within the shift register array to shift one unit up which causes both execution lanes to be aligned with the right edge of the middle row of their respective stencils. Register R1 of both execution lanes currently includes the summation of the stencil's top row and the middle row's rightmost value. FIGS. 11f and 11g demonstrate continued progress moving leftwise across the middle row of both execution lane's stencils. The accumulative addition continues such that at the end of processing of FIG. 11g both execution lanes include the summation of the values of the top row and the middle row of their respective stencils.

Figure 11H:
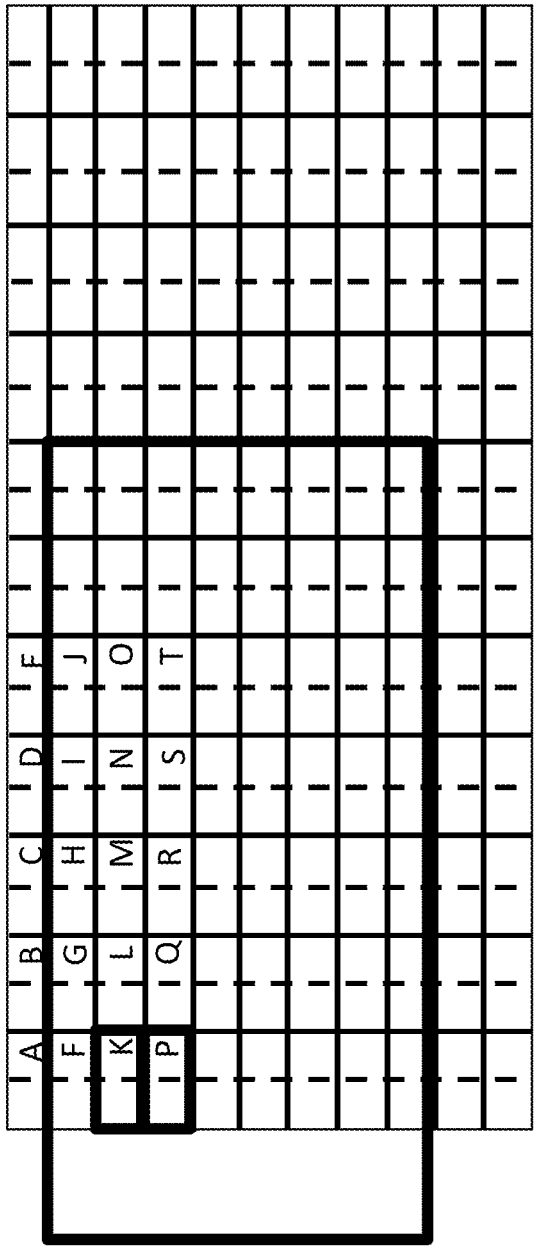
Figure 11I:
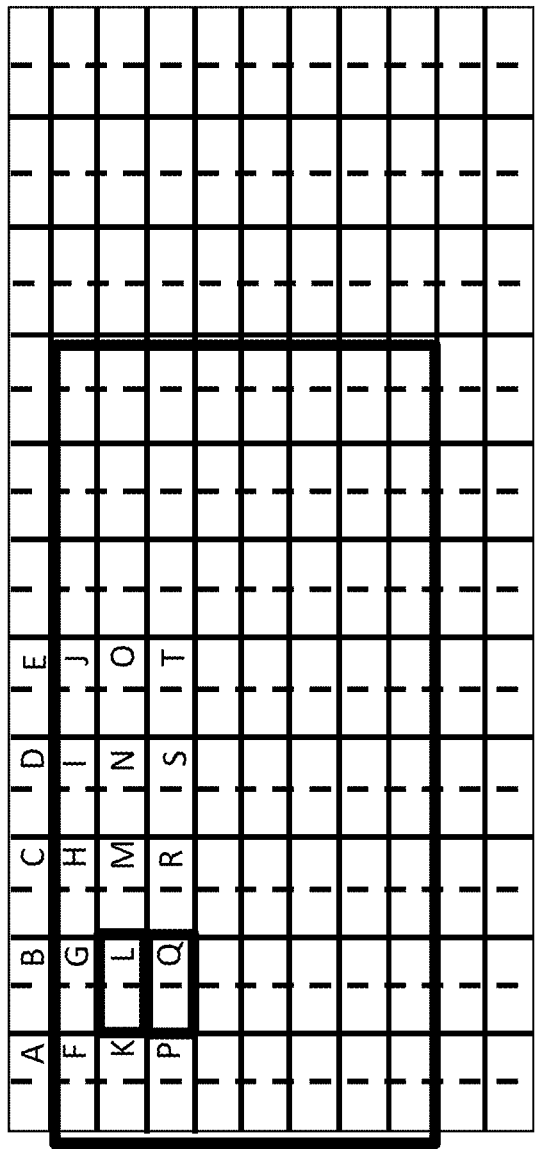
Figure 11J:
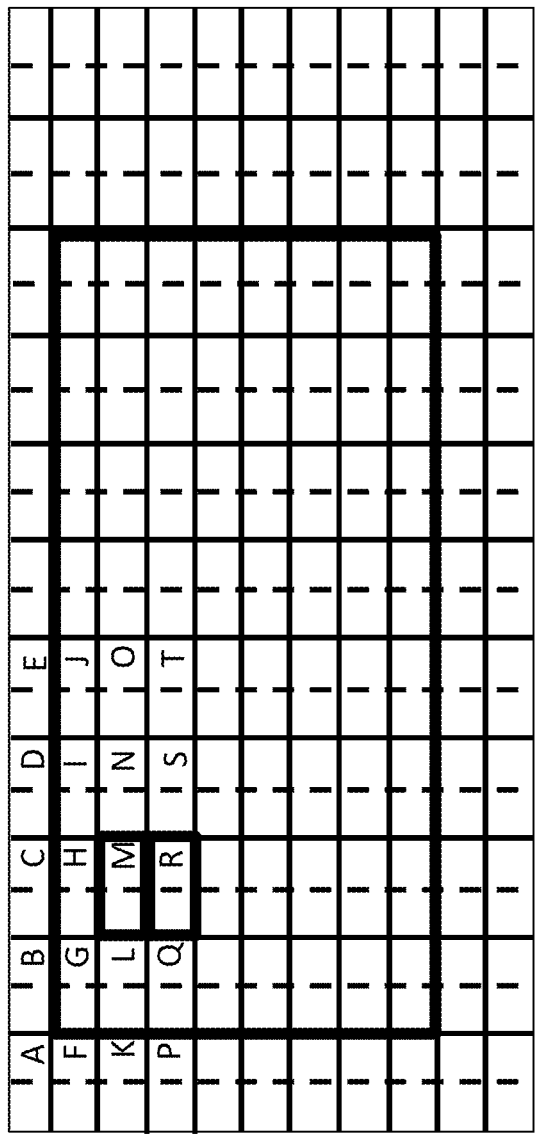
Figure 11K:
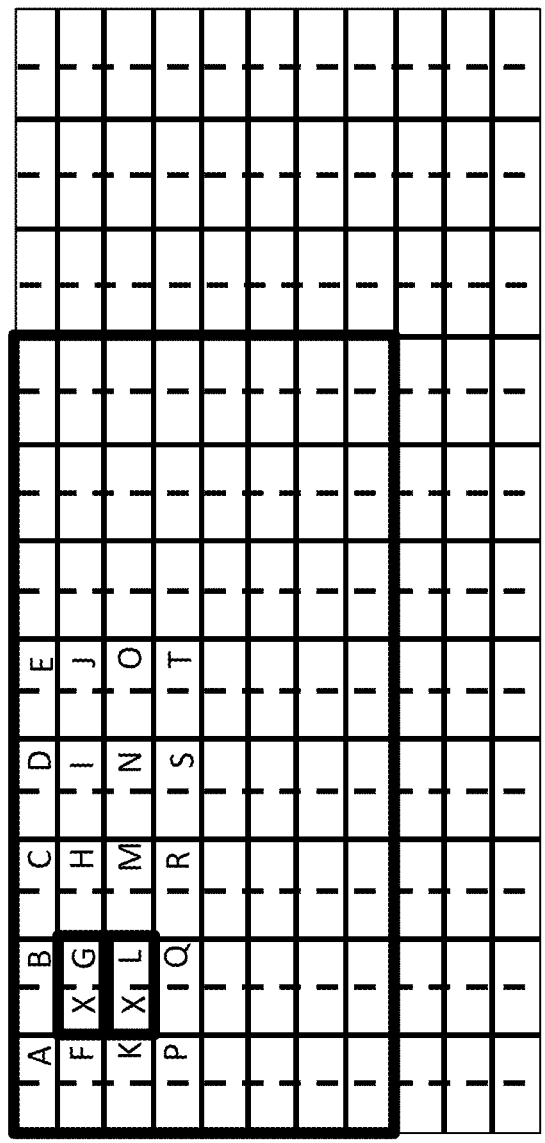

FIG. 11h shows another shift to align each execution lane with its corresponding stencil's lowest row. FIGS. 11i and 11j show continued shifting to complete processing over the course of both execution lanes' stencils. FIG. 11k shows additional shifting to align each execution lane with its correct position in the data array and write the resultant thereto.

In the example of FIGS. 11a-11k note that the object code for the shift operations may include an instruction format that identifies the direction and magnitude of the shift expressed in (X, Y) coordinates. For example, the object code for a shift up by one location may be expressed in object code as SHIFT 0, +1. As another example, a shift to the right by one location may expressed in object code as SHIFT +1, 0. In various embodiments shifts of larger magnitude may also be specified in object code (e.g., SHIFT 0, +2). Here, if the 2D shift register hardware only supports shifts by one location per cycle, the instruction may be interpreted by the machine to require multiple cycle execution, or, the 2D shift register hardware may be designed to support shifts by more than one location per cycle. Embodiments of the later are described in more detail further below.

FIG. 12 shows another, more detailed depiction of the unit cell for an execution lane and corresponding shift register structure (registers in the halo region do not include a corresponding execution lane but do include a memory unit in various embodiments). The execution lane and the register space associated with each location in the execution lane array is, in an embodiment, implemented by instantiating the circuitry observed in FIG. 12 at each node of the execution lane array. As observed in FIG. 12, the unit cell includes a execution lane 1201 coupled to a register file 1202 consisting of four registers R2 through R5. During any cycle, the execution lane 1201 may read from or write to any of registers R1 through R5. For instructions requiring two input operands the execution lane may retrieve both of operands from any of R1 through R5.

In an embodiment, the two dimensional shift register structure is implemented by permitting, during a single cycle, the contents of any of (only) one of registers R2 through R4 to be shifted "out" to one of its neighbor's register files through output multiplexer 1203, and, having the contents of any of (only) one of registers R2 through R4 replaced with content that is shifted "in" from a corresponding one if its neighbors through input multiplexers 1204 such that shifts between neighbors are in a same direction (e.g., all execution lanes shift left, all execution lanes shift right, etc.). Although it may be common for a same register to have its contents shifted out and replaced with content that is shifted in on a same cycle, the multiplexer arrangement 1203, 1204 permits for different shift source and shift target registers within a same register file during a same cycle.

As depicted in FIG. 12 note that during a shift sequence a execution lane will shift content out from its register file 1202 to each of its left, right, top and bottom neighbors. In conjunction with the same shift sequence, the execution lane will also shift content into its register file from a particular one of its left, right, top and bottom neighbors. Again, the shift out target and shift in source should be consistent with a same shift direction for all execution lanes (e.g., if the shift out is to the right neighbor, the shift in should be from the left neighbor).

Although in one embodiment the content of only one register is permitted to be shifted per execution lane per cycle, other embodiments may permit the content of more than one register to be shifted in/out. For example, the content of two registers may be shifted out/in during a same cycle if a second instance of the multiplexer circuitry 1203, 1204 observed in FIG. 12 is incorporated into the design of FIG. 12. Of course, in embodiments where the content of only one register is permitted to be shifted per cycle, shifts from multiple registers may take place between mathematical operations by consuming more clock cycles for shifts between mathematical operations (e.g., the contents of two registers may be shifted between math ops by consuming two shift ops between the math ops).

If less than all the content of a execution lane's register files are shifted out during a shift sequence note that the content of the non shifted out registers of each execution lane remain in place (do not shift). As such, any non shifted content that is not replaced with shifted in content persists local to the execution lane across the shifting cycle. The memory unit ("M") observed in each execution lane is used to load/store data from/to the random access memory space that is associated with the execution lane's row and/or column within the execution lane array. Here, the M unit acts as a standard M unit in that it is often used to load/store data that cannot be loaded/stored from/to the execution lane's own register space. In various embodiments, the primary operation of the M unit is to write data from a local register into memory, and, read data from memory and write it into a local register.

With respect to the ISA opcodes supported by the ALU unit of the hardware execution lane 1201, in various embodiments, the mathematical opcodes supported by the hardware ALU include (e.g., ADD, SUB, MOV, MUL, MAD, ABS, DIV, SHL, SHR, MIN/MAX, SEL, AND, OR, XOR, NOT). As described just above, memory access instructions can be executed by the execution lane 1201 to fetch/store data from/to their associated random access memory. Additionally the hardware execution lane 1201 supports shift op instructions (right, left, up, down) to shift data within the two dimensional shift register structure. As described above, program control instructions are largely executed by the scalar processor of the stencil processor.

G. Implementation Embodiments

It is pertinent to point out that the various image processor architecture features described above are not necessarily limited to image processing in the traditional sense and therefore may be applied to other applications that may (or may not) cause the image processor to be re-characterized. For example, if any of the various image processor architecture features described above were to be used in the creation and/or generation and/or rendering of animation as opposed to the processing of actual camera images, the image processor may be characterized as a graphics processing unit. Additionally, the image processor architectural features described above may be applied to other technical applications such as video processing, vision processing, image recognition and/or machine learning. Applied in this manner, the image processor may be integrated with (e.g., as a co-processor to) a more general purpose processor (e.g., that is or is part of a CPU of computing system), or, may be a stand alone processor within a computing system.

The hardware design embodiments discussed above may be embodied within a semiconductor chip and/or as a description of a circuit design for eventual targeting toward a semiconductor manufacturing process. In the case of the later, such circuit descriptions may take of the form of a (e.g., VHDL or Verilog) register transfer level (RTL) circuit description, a gate level circuit description, a transistor level circuit description or mask description or various combinations thereof. Circuit descriptions are typically embodied on a computer readable storage medium (such as a CD-ROM or other type of storage technology).

From the preceding sections is pertinent to recognize that an image processor as described above may be embodied in hardware on a computer system (e.g., as part of a handheld device's System on Chip (SOC) that processes data from the handheld device's camera). In cases where the image processor is embodied as a hardware circuit, note that the image data that is processed by the image processor may be received directly from a camera. Here, the image processor may be part of a discrete camera, or, part of a computing system having an integrated camera. In the case of the later the image data may be received directly from the camera or from the computing system's system memory (e.g., the camera sends its image data to system memory rather than the image processor). Note also that many of the features described in the preceding sections may be applicable to a graphics processor unit (which renders animation).

FIG. 13 provides an exemplary depiction of a computing system. Many of the components of the computing system described below are applicable to a computing system having an integrated camera and associated image processor (e.g., a handheld device such as a smartphone or tablet computer). Those of ordinary skill will be able to easily delineate between the two. Additionally, the computing system of FIG. 13 also includes many features of a high performance computing system, such as a workstation or supercomputer.

As observed in FIG. 13, the basic computing system may include a central processing unit 1301 (which may include, e.g., a plurality of general purpose processing cores 1315_1 through 1315_N and a main memory controller 1317 disposed on a multi-core processor or applications processor), system memory 1302, a display 1303 (e.g., touchscreen, flat-panel), a local wired point-to-point link (e.g., USB) interface 1304, various network I/O functions 1305 (such as an Ethernet interface and/or cellular modem subsystem), a wireless local area network (e.g., WiFi) interface 1306, a wireless point-to-point link (e.g., Bluetooth) interface 1307 and a Global Positioning System interface 1308, various sensors 1309_1 through 1309_N, one or more cameras 1310, a battery 1311, a power management control unit 1312, a speaker and microphone 1313 and an audio coder/decoder 1314.

An applications processor or multi-core processor 1350 may include one or more general purpose processing cores 1315 within its CPU 1201, one or more graphical processing units 1316, a memory management function 1317 (e.g., a memory controller), an I/O control function 1318 and an image processing unit 1319. The general purpose processing cores 1315 typically execute the operating system and application software of the computing system. The graphics processing units 1316 typically execute graphics intensive functions to, e.g., generate graphics information that is presented on the display 1303. The memory control function 1317 interfaces with the system memory 1302 to write/read data to/from system memory 1302. The power management control unit 1312 generally controls the power consumption of the system 1300.

The image processing unit 1319 may be implemented according to any of the image processing unit embodiments described at length above in the preceding sections. Alternatively or in combination, the IPU 1319 may be coupled to either or both of the GPU 1316 and CPU 1301 as a co-processor thereof. Additionally, in various embodiments, the GPU 1316 may be implemented with any of the image processor features described at length above.

Each of the touchscreen display 1303, the communication interfaces 1304-1307, the GPS interface 1308, the sensors 1309, the camera 1310, and the speaker/microphone codec 1313, 1314 all can be viewed as various forms of I/O (input and/or output) relative to the overall computing system including, where appropriate, an integrated peripheral device as well (e.g., the one or more cameras 1310). Depending on implementation, various ones of these I/O components may be integrated on the applications processor/multi-core processor 1350 or may be located off the die or outside the package of the applications processor/multi-core processor 1350.

In an embodiment one or more cameras 1310 includes a depth camera capable of measuring depth between the camera and an object in its field of view. Application software, operating system software, device driver software and/or firmware executing on a general purpose CPU core (or other functional block having an instruction execution pipeline to execute program code) of an applications processor or other processor may perform any of the functions described above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired and/or programmable logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions.

For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An image processor, comprising:
   a storage circuit to store segments of input image data received in a raster scan format;
   a reformatting circuit to convert the segments of input image data into a block image format, wherein the reformatting circuit comprises register space to keep pointers that point to the segments of the input image data, and wherein the reformatting circuit is configured to recognize when a block of the input image data has been stored in the storage circuit and cause segments within the storage circuit that correspond to the block to be read from the storage circuit by referring to the pointers in the register space;
   a processor comprising a two-dimensional execution lane array and a two-dimensional shift register array, the two-dimensional shift register array to store the input image data that has been formatted into the block image format, the execution lane array to execute instructions that operate on the image data from the two-dimensional shift register array.

2. The image processor of claim 1 wherein the pointers are organized in the register space to have a first dimension that corresponds to a row width of the raster scan format and to have a second dimension that corresponds to a pixel height of the block format.

3. The image processor of claim 1 wherein the reformatting circuit supports any of the following:
   configurable segment sizes;
   configurable raster scan row width sizes;
   configurable block pixel height sizes.

4. The image processor of claim 1 wherein the reformatting circuit is also to perform output block image to output image raster scan conversion.

5. The image processor of claim 1 wherein the reformatting circuit supports multiple raster scan to block image conversion channels.

6. A computing system, comprising:
   a) one or more general purpose processor cores;
   b) a system memory
   c) a memory controller coupled to the system memory;
   d) an image processor comprising i), ii) and iii) below:
      i) a storage circuit to store segments of input image data received in a raster scan format;
      ii) a reformatting circuit to convert the segments of input image data into a block image format, wherein the reformatting circuit comprises register space to keep pointers that point to the segments of the input image data, and wherein the reformatting circuit is configured to recognize when a block of the input image data has been stored in the storage circuit and cause segments within the storage circuit that correspond to the block to be read from the storage circuit by referring to the pointers in the register space;
      iii) a processor comprising a two-dimensional execution lane array and a two-dimensional shift register array, the two-dimensional shift register array to store the input image data that has been formatted into the block image format, the execution lane array to execute instructions that operate on the image data from the two-dimensional shift register array.

7. The computing system of claim 6 wherein the pointers are organized in the register space to have a first dimension that corresponds to a row width of the raster scan format and to have a second dimension that corresponds to a pixel height of the block format.

8. The computing system of claim 6 wherein the reformatting circuit supports any of the following:
   configurable segment sizes;
   configurable raster scan row width sizes;
   configurable block pixel height sizes.

9. The computing system of claim 6 wherein the reformatting circuit is also to perform output block image to output image raster scan conversion.

10. The computing system of claim 6 wherein the reformatting circuit supports multiple raster scan to block image conversion channels.

11. A method, comprising:
   storing input image data received in a raster scan format as segments within a storage circuit;
   reformatting the input image data into a block image format by reading certain ones of the segments from the storage circuit, comprising keeping pointers within register space that point to the segments of the input image data, and recognizing when a block of the input image data has been stored in the storage circuit and causing segments within the storage circuit that correspond to the block to be read from the storage circuit by referring to the pointers in the register space; and,
   processing the block image formatted input image data with a processor comprising a two-dimensional execution lane array and a two-dimensional shift register array.

12. The method of claim 11, wherein the pointers are organized in the register space to have a first dimension that corresponds to a row width of the raster scan format and to have a second dimension that corresponds to a pixel height of the block format.

13. The method of claim 11 further comprising performing any of the following to perform the reformatting:
   configuring a segment size;
   configuring a raster scan row width size;
   configuring a block pixel height size.

14. The method of claim 11 further comprising storing block output image data as output segments into the storage circuit and reading certain ones of the output segments from the storage circuit to form raster scan formatted output image data.

* * * * *

UNITED STATES PATENT AND TRADEMARK OFFICE
CERTIFICATE OF CORRECTION

PATENT NO. : 10,503,689 B2
APPLICATION NO. : 15/595316
DATED : December 10, 2019
INVENTOR(S) : Khan et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 286 days.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*